United States Patent
Lermen et al.

(10) Patent No.: US 10,100,915 B2
(45) Date of Patent: Oct. 16, 2018

(54) TRANSMISSION UNIT

(71) Applicant: Pinion GmbH, Stuttgart (DE)

(72) Inventors: Christoph Lermen, Stuttgart (DE); Michael Schmitz, Niederelbert (DE)

(73) Assignee: Pinion GmbH, Denkendorf (DE)

( * ) Notice: Subject to any disclaimer, the term of this patent is extended or adjusted under 35 U.S.C. 154(b) by 0 days.

(21) Appl. No.: 15/068,624

(22) Filed: Mar. 13, 2016

(65) Prior Publication Data

US 2016/0195184 A1    Jul. 7, 2016

Related U.S. Application Data

(63) Continuation of application No. 12/449,051, filed as application No. PCT/EP2008/000414 on Jan. 21, 2008, now Pat. No. 9,302,738.

(30) Foreign Application Priority Data

Jan. 22, 2007   (DE) .................. 10 2007 004 802

(51) Int. Cl.
    *F16H 3/08*    (2006.01)
    *F16H 57/021*    (2012.01)
    *B62M 11/06*    (2006.01)
    *B62M 11/14*    (2006.01)

(52) U.S. Cl.
    CPC .......... *F16H 57/021* (2013.01); *B62M 11/06* (2013.01); *B62M 11/145* (2013.01); *Y10T 74/19233* (2015.01); *Y10T 74/19642* (2015.01)

(58) Field of Classification Search
CPC .... B62M 11/06; B62M 11/145; F16H 57/021; F16H 2057/0216; F16H 2057/0235; F16H 57/031; F16H 2057/005; F16H 57/023
See application file for complete search history.

(56) References Cited

U.S. PATENT DOCUMENTS

| | | | |
|---|---|---|---|
| 1,773,996 A | 8/1930 | Gordon | |
| 2,431,982 A | 12/1947 | Barnett | |
| 2,660,070 A | 11/1953 | Magis | |
| 2,760,385 A | 8/1956 | Fuchs | |
| 3,948,542 A * | 4/1976 | Lukich | B62M 1/20 280/223 |
| 4,140,195 A | 2/1979 | Watanabe et al. | |
| 4,271,727 A * | 6/1981 | Brems | B23Q 16/06 74/813 R |

(Continued)

FOREIGN PATENT DOCUMENTS

| | | |
|---|---|---|
| DE | 643850 C | 4/1937 |
| DE | 637719 C | 5/1937 |

(Continued)

OTHER PUBLICATIONS

German Examination Report, in German, corresponding to DE application No. 102007004802.7, dated Jun. 6, 2014, 6 pages.

*Primary Examiner* — Jake Cook
(74) *Attorney, Agent, or Firm* — Reising Ethington P.C.

(57) ABSTRACT

A transmission unit for a vehicle driven by muscle power. The transmission unit has one through shaft and one output shaft, as well as at least two sub-transmissions and at least one intermediate shaft. In the transmission unit at least one of the intermediate shafts and the output shaft is formed as a hollow shaft which is arranged coaxially to another shaft of the transmission unit.

7 Claims, 13 Drawing Sheets

(56) References Cited

U.S. PATENT DOCUMENTS

| | | | |
|---|---|---|---|
| 4,472,983 A | * | 9/1984 | Brems .............. F16H 35/02 |
| | | | 74/337.5 |
| 4,716,777 A | | 1/1988 | Hartmann |
| 4,721,015 A | | 1/1988 | Hartmann |
| 5,261,294 A | | 11/1993 | Ticer et al. |
| 5,404,768 A | | 4/1995 | Hwang et al. |
| 5,517,873 A | | 5/1996 | Gordon |
| 5,553,510 A | * | 9/1996 | Balhorn ............ B62M 11/06 |
| | | | 192/64 |
| 5,667,233 A | | 9/1997 | Metzinger |
| 5,975,266 A | | 11/1999 | Balhom |
| 6,089,114 A | | 7/2000 | Kang |
| 6,258,005 B1 | | 7/2001 | Rohloff |
| 6,318,198 B1 | | 11/2001 | Gordon |
| 6,852,060 B1 | | 2/2005 | Ash |
| 7,294,076 B2 | | 11/2007 | Matsumoto et al. |
| 7,338,058 B2 | | 3/2008 | Nicolai |
| 7,644,944 B2 | | 1/2010 | Nicolai |
| 9,302,738 B2 | | 4/2016 | Lermen et al. |
| 2003/0213318 A1 | | 11/2003 | Matsumoto et al. |
| 2005/0221943 A1 | | 10/2005 | Kuhstrebe |

FOREIGN PATENT DOCUMENTS

| | | |
|---|---|---|
| DE | 19712444 A1 | 10/1998 |
| DE | 19720794 A1 | 11/1998 |
| DE | 19720796 A1 | 11/1998 |
| DE | 10339207 A1 | 6/2005 |
| DE | 102004045364 A1 | 3/2006 |
| EP | 1445088 A2 | 8/2004 |
| FR | 2776613 A1 | 10/1999 |

* cited by examiner

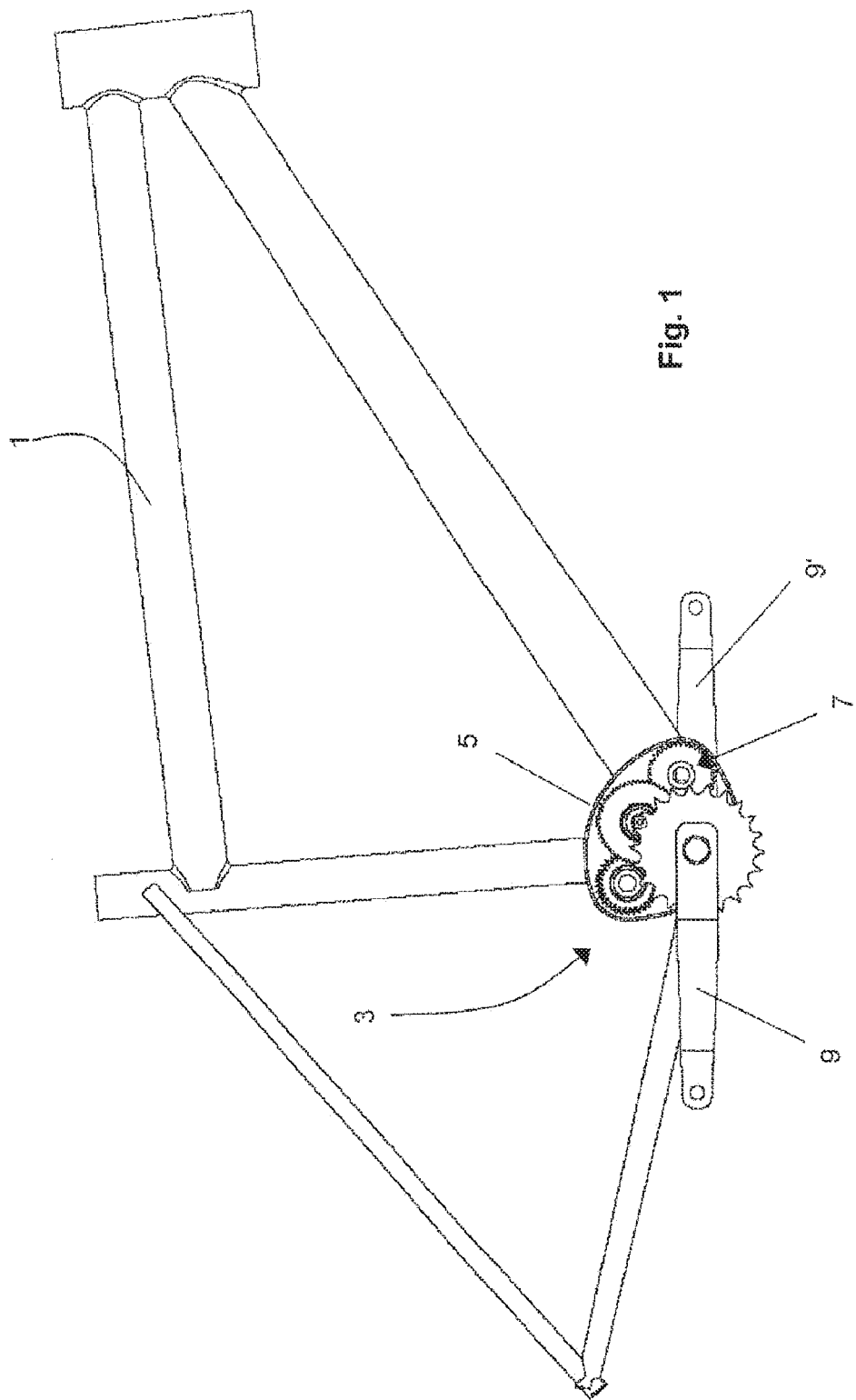

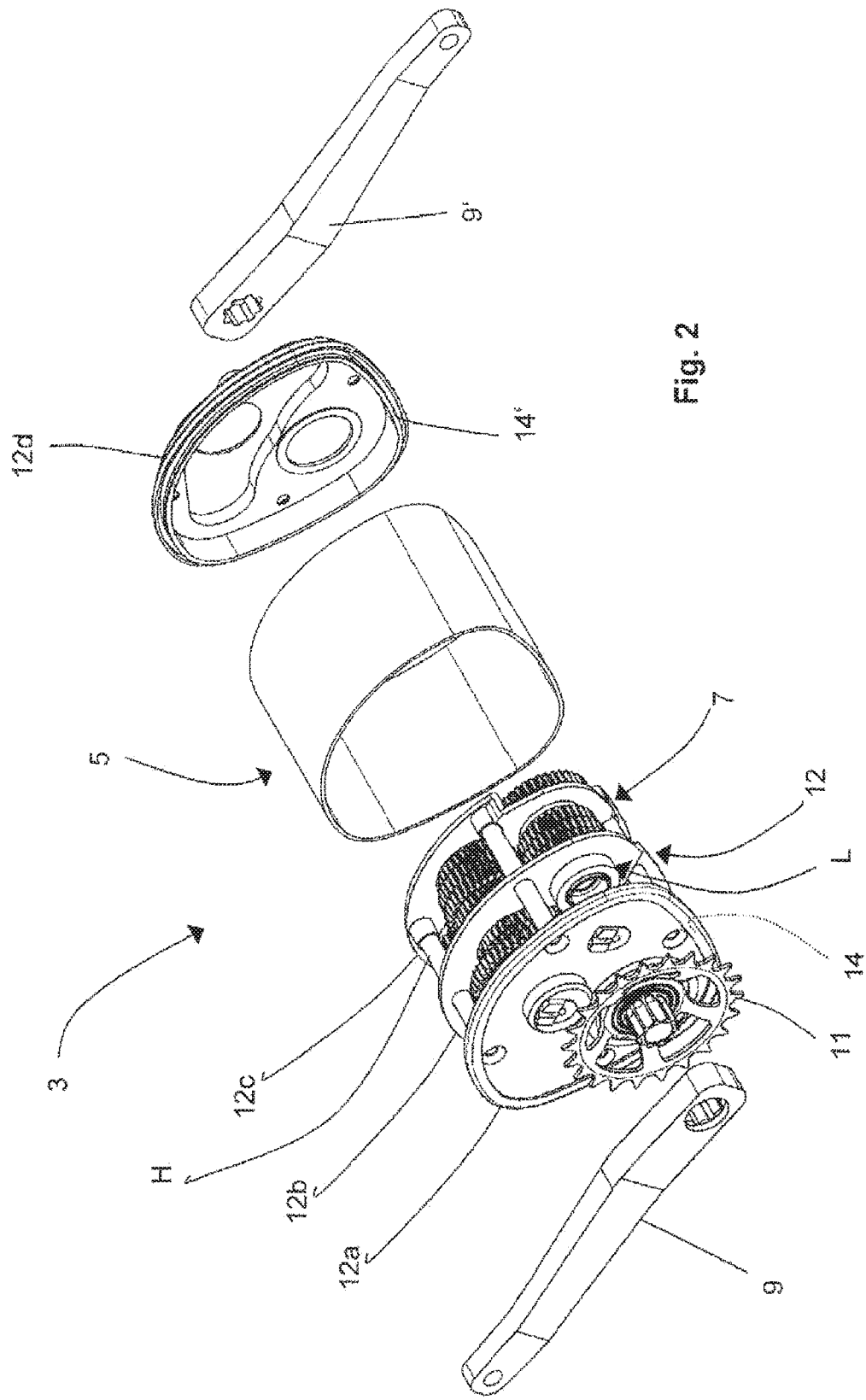

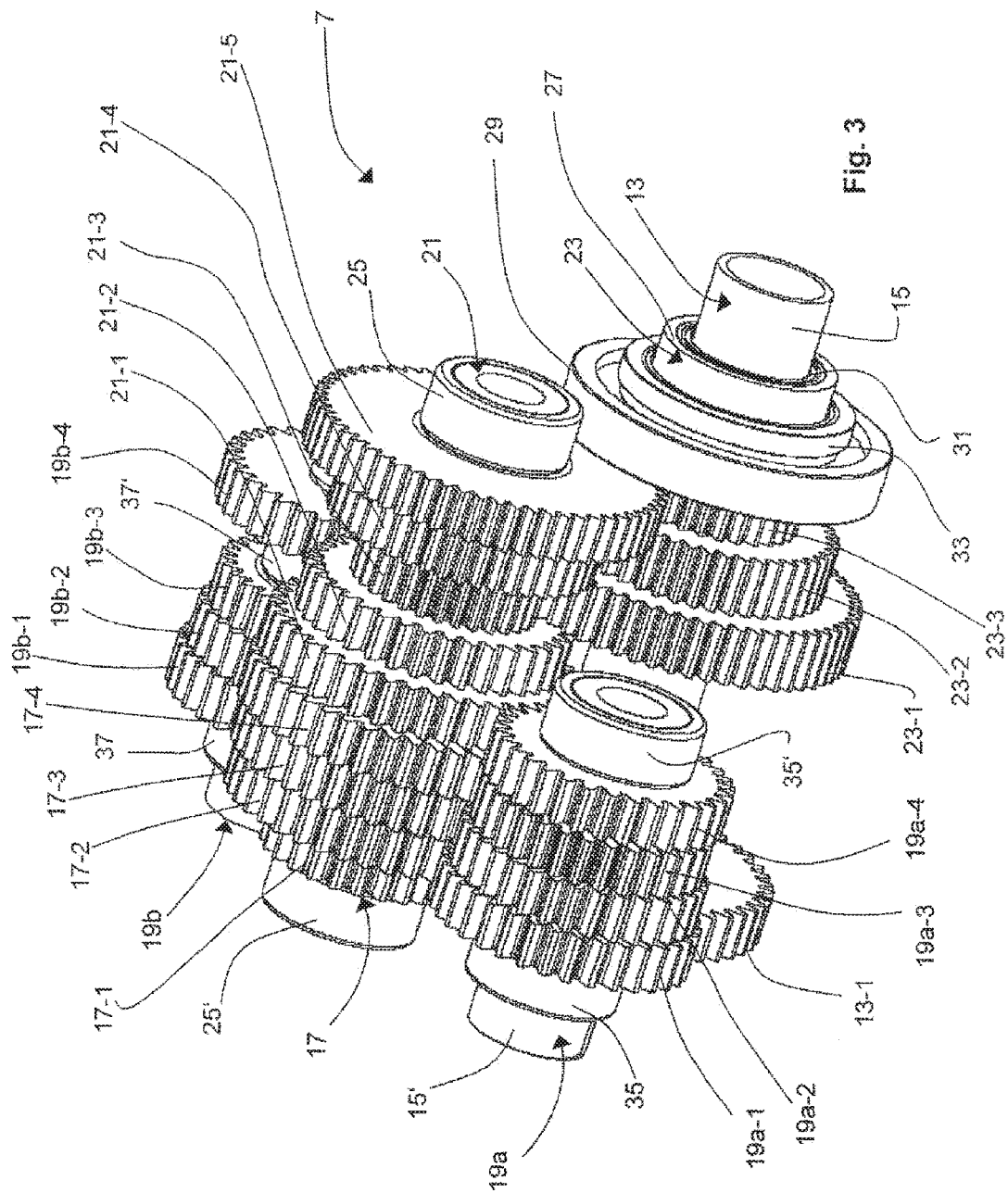

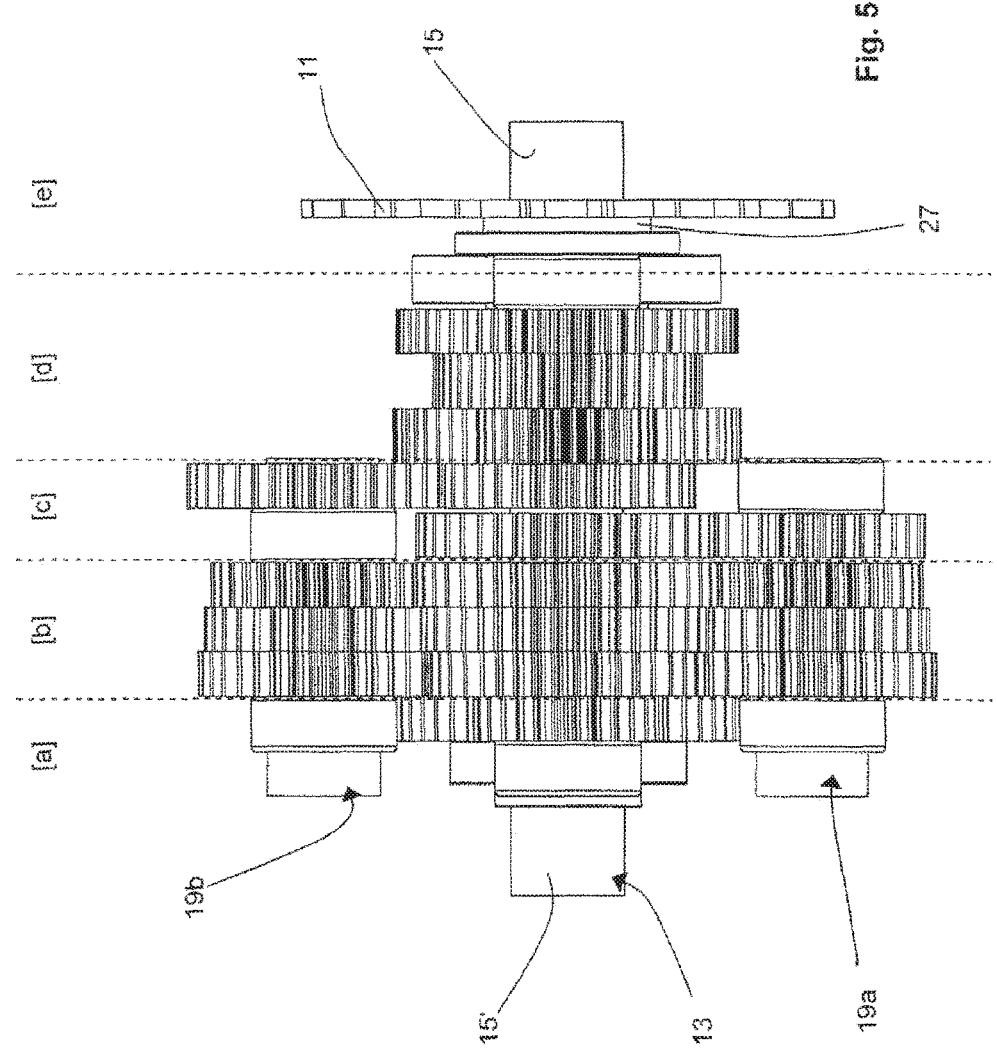

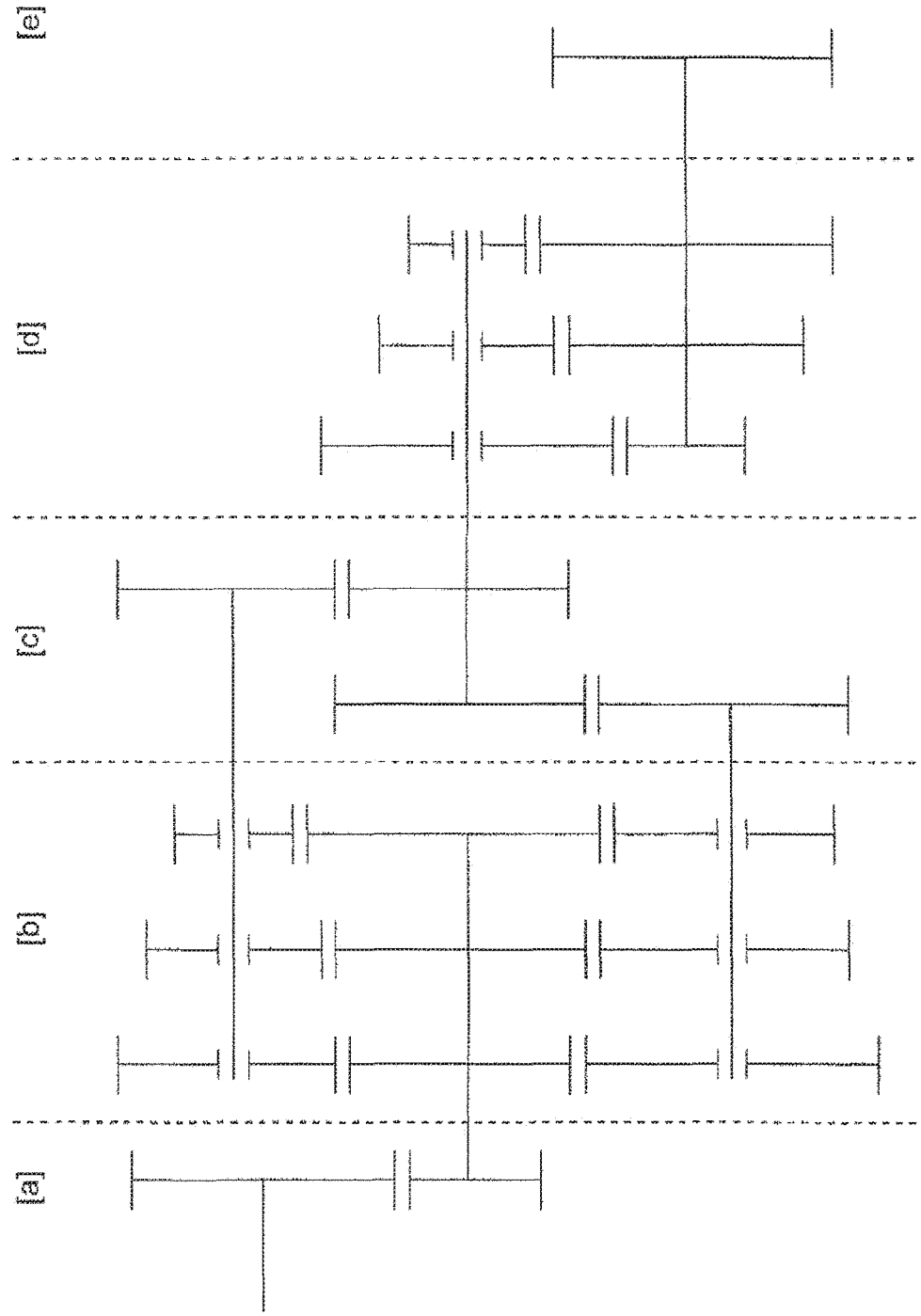

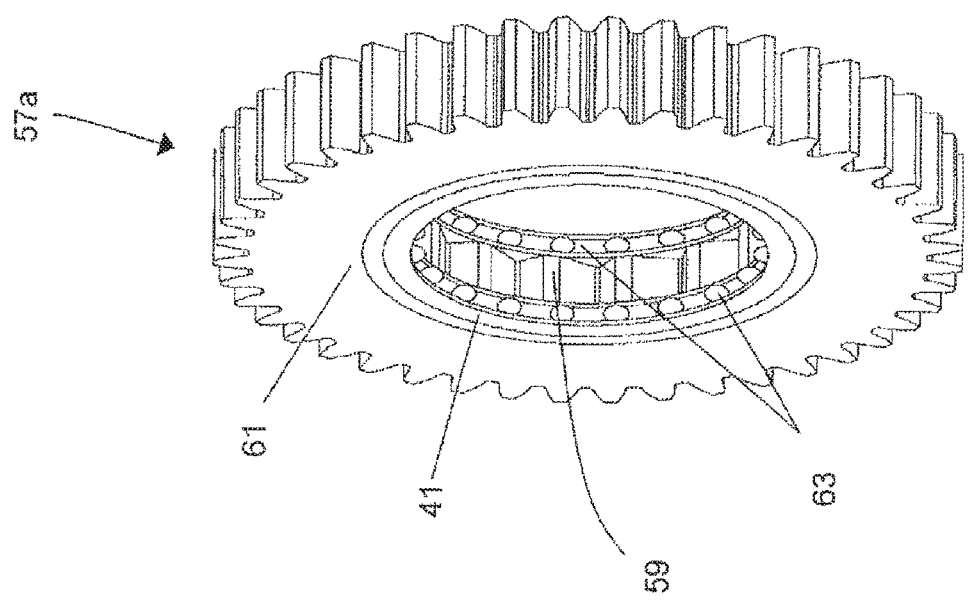
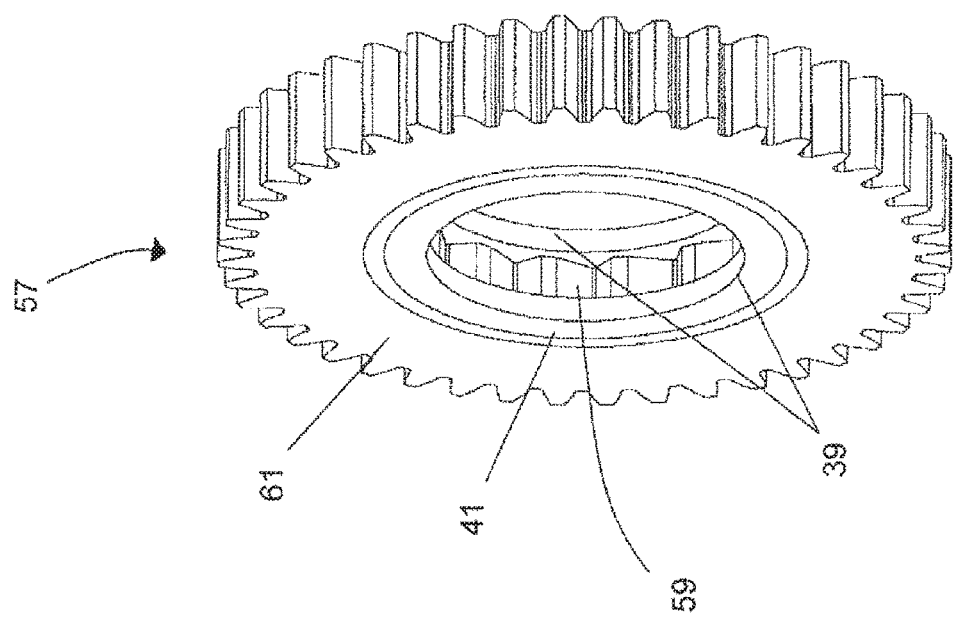
Fig. 9

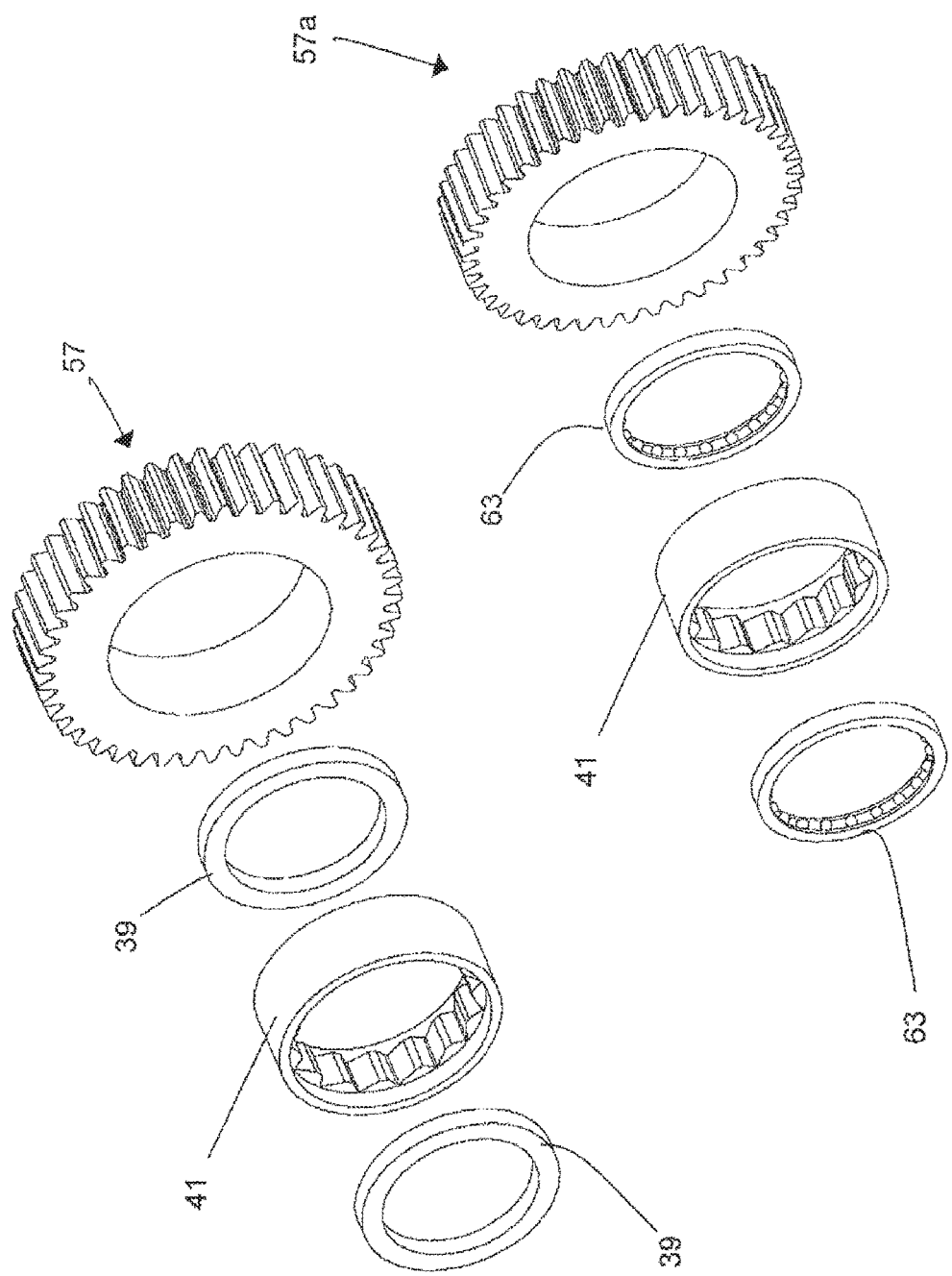

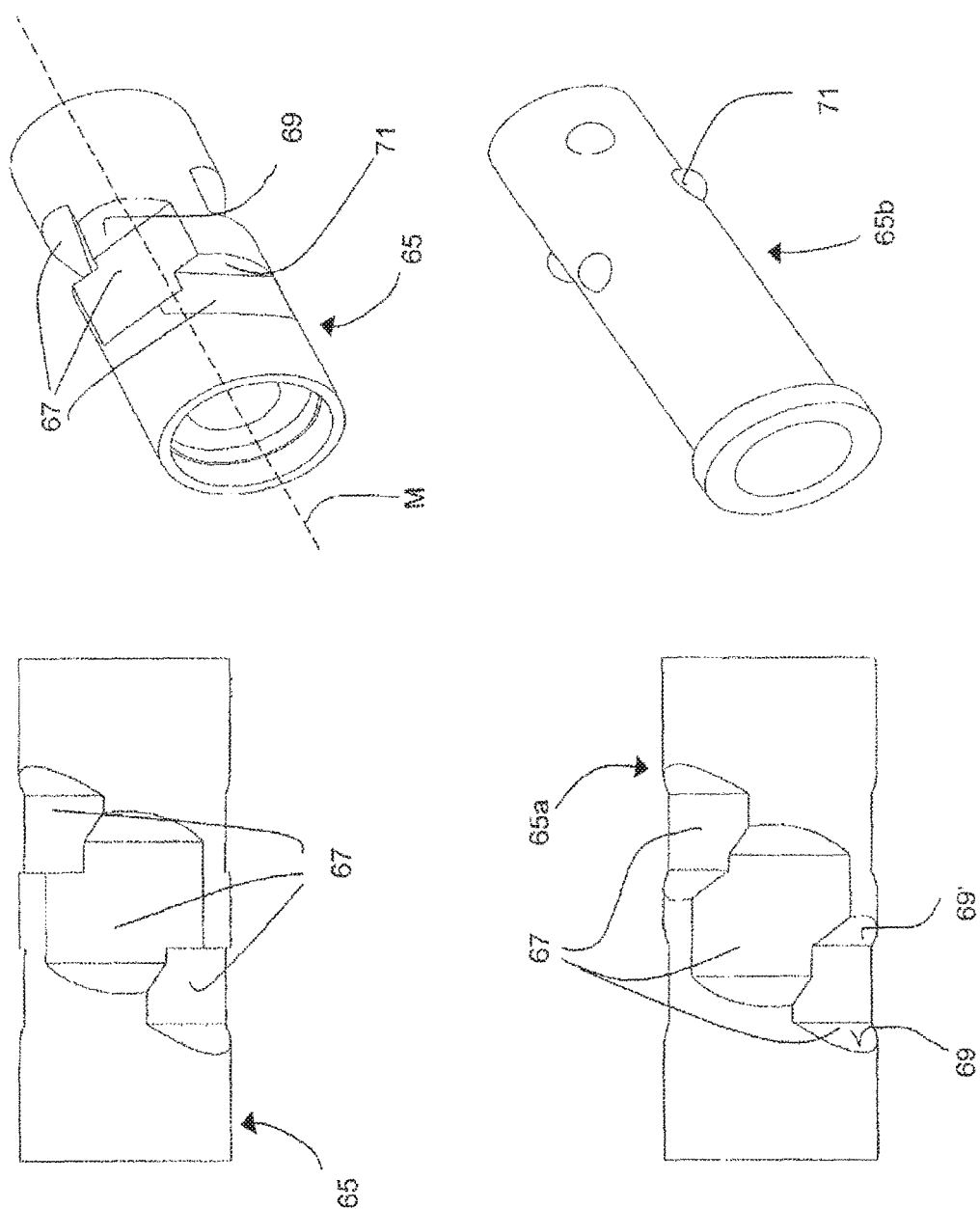

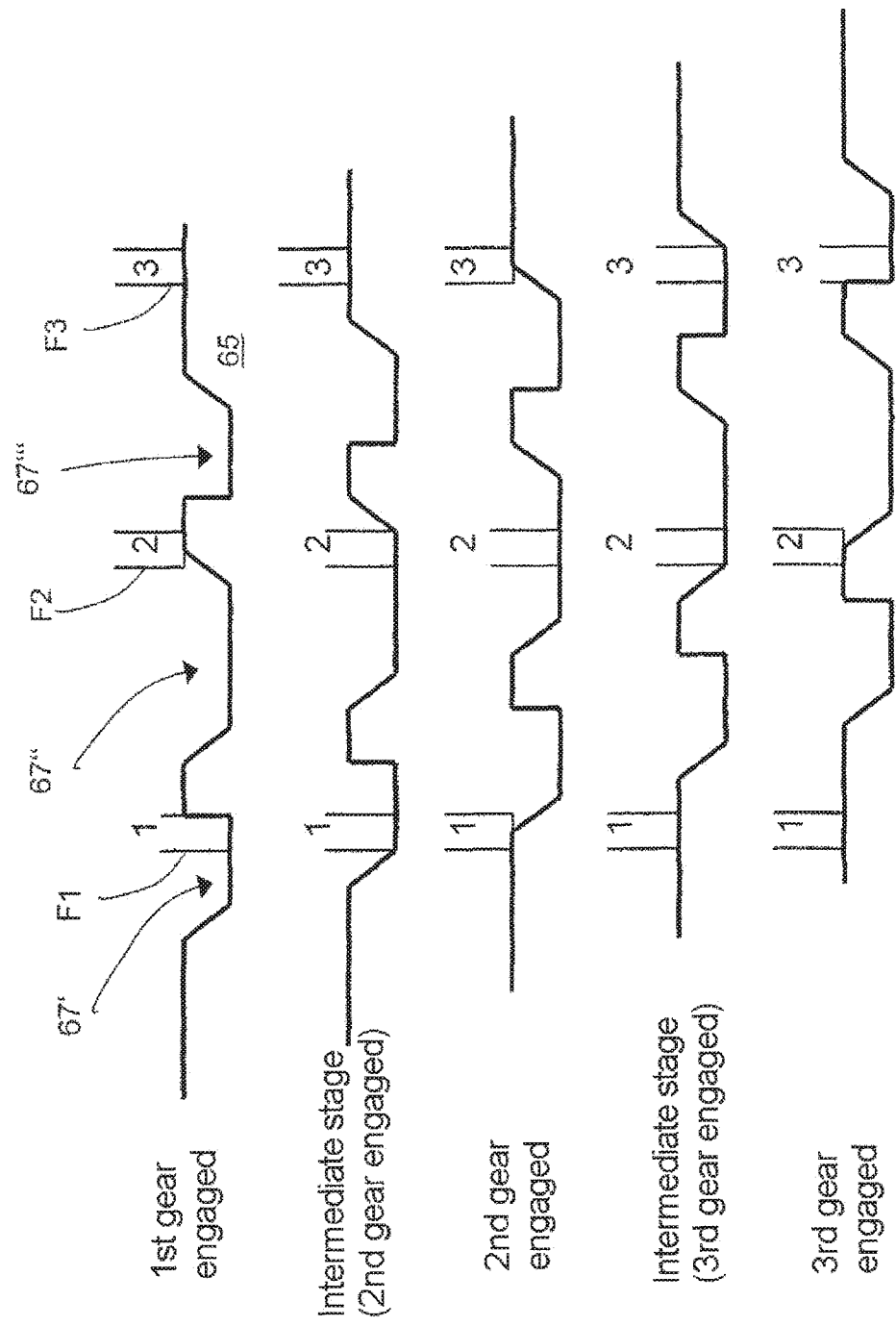

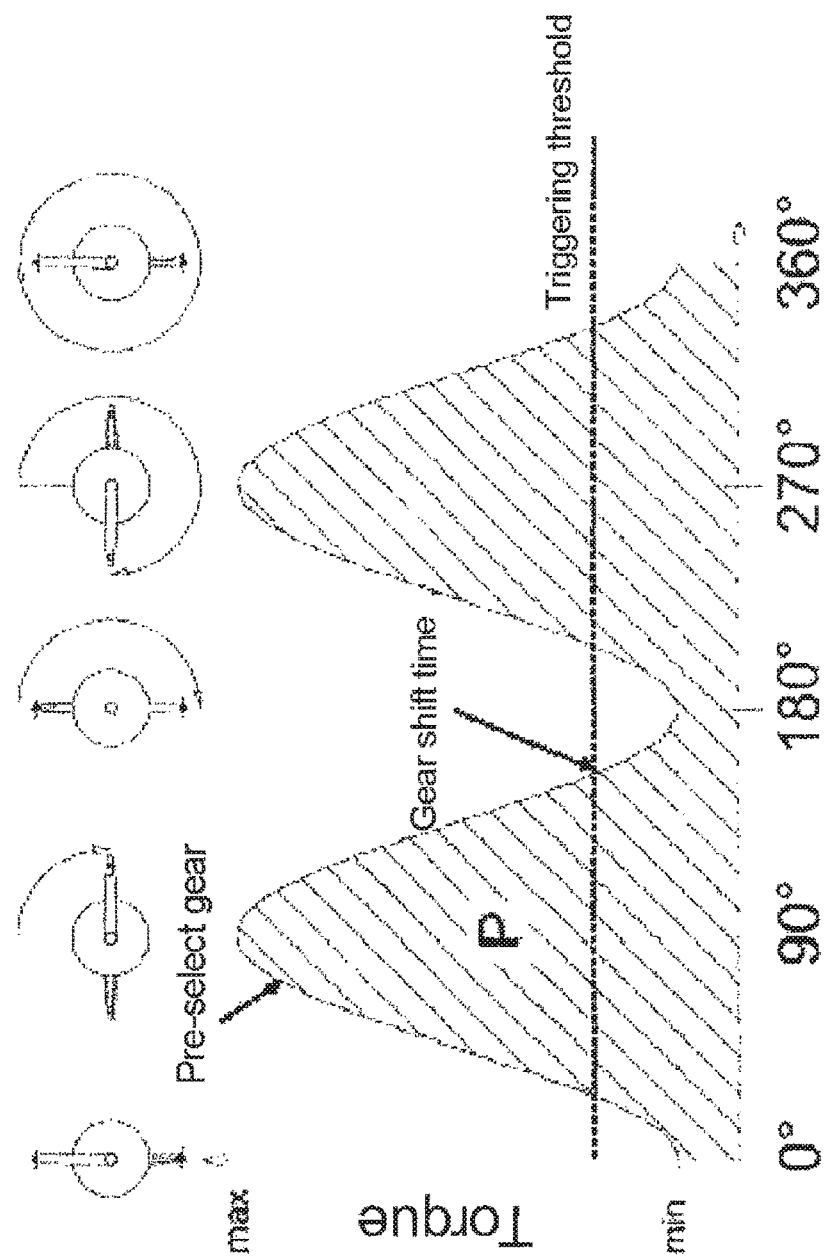

TRANSMISSION UNIT

BACKGROUND OF THE INVENTION

The invention relates to a transmission unit for a muscle-powered vehicle.

In recent decades, the basic principles of gearshift mechanisms for bicycles in particular have not changed substantially. The gearshift mechanism is primarily located on the rear axle, wherein two systems have substantially become popular, namely derailleur gearshift mechanisms on the one hand and internal-gear hubs on the other. In both systems a chain is used to transmit the drive force to the rear axle of the bicycle.

The term derailleur gearshift mechanism is generally used to describe a pack of sprockets mounted on the rear axle comprising up to ten sprockets, between which it is possible to shift back and forth by means of a shift mechanism which is mounted on the frame and serves to guide the chain. In order to widen the transmission range, most bicycles are equipped with an additional gearshift mechanism at the chain wheel of the bottom bracket. For this purpose, up to three chain wheels are attached on one side of the foot pedals, between which it is possible to shift back and forth by means of a front derailleur mounted on the frame. This type of derailleur gearshift mechanism offers up to 30 gears and an overall transmission ratio of up to approximately 600%. However, due to the nature of the design and depending on the layout, many of the gears are redundant on derailleur gearshift mechanisms. For example, a standard commercially available derailleur gearshift mechanism with 27 gears only has 15 non-redundant gears.

The components of a derailleur gearshift mechanism are mounted externally on the frame of the bicycle and are hence directly exposed to environmental influences, such as water and dirt. As a result, the high efficiency of a derailleur gearshift mechanism is reduced particularly quickly, which means that a large proportion of the expended muscular energy is lost through friction. Furthermore, derailleur gearshift mechanisms require very precise adjustment in order to ensure accurate performance. Due to the outward-lying design, the components are susceptible to damage caused by falls or contact with stones or branches. As the chain runs at an—in some cases large—angle, and due to the frequent derailing of the chain between sprockets, the chain and the sprockets are especially subject to high wear and require regular replacement. The known gearshift mechanisms for bicycles thus have the disadvantage that, in order to ensure perfect operation and a high level of efficiency, the level of maintenance required for a derailleur gearshift mechanism is correspondingly high and cost-intensive.

By contrast, the term internal-gear hub is used to describe a gearing mechanism which is integrated in the hub housing of the rear axle. In the case of most internal-gear hubs, the gearing mechanism comprises a plurality of planetary gear stages between which it is possible to shift back and forth. In comparison to derailleur gearshift mechanisms, an internal-gear hub has no outward-lying gearshift components such as shift unit, sprocket pack, a plurality of chain wheels or derailleurs. Consequently, internal-gear hubs are more low-maintenance than derailleur gearshift mechanisms, but they offer lower overall transmission ratios. An internal-gear hub, such as is disclosed for example in DE 197 20 794 A1, currently has up to 14 gears and an overall transmission ratio of up to 524%. However, due to the arrangement of the internal-gear hub on the hub of the rear axle, on the one hand the weight of the rotating mass is increased, while on the other hand in the case of bicycles with rear suspension the unsprung mass seen in relation to the overall weight is also increased. Furthermore, the centre of gravity of the bicycle is also shifted towards the rear axle. These factors have a disadvantageous effect on the riding characteristics of bicycles, particularly in the case of mountain bikes with rear suspension.

Bicycles having a gearing mechanism which is positioned in close proximity to the bottom bracket (pedal bearing) and is integrated in the frame represent a recent speciality. Such a gearing mechanism is described, for example, in DE 10 2004 045 364 A1 or DE 103 39 207 A1. In order to realise such a gearing mechanism, a plurality of intermediate shafts having switchable gear wheels is provided in a gear housing. The bottom bracket either directly forms part of the gearing mechanism, or a rotary motion is initially transmitted from the bottom bracket via a drive mechanism onto the gearing mechanism. Starting from an output shaft of the gearing mechanism, the force is then, in the same manner as in the previously mentioned gearshift mechanisms, transmitted by means of a chain drive to the rear wheel. One particularly advantageous feature of these gearshift mechanisms is the fact that the mass of the gearing mechanism tends to lie in the proximity of the centre point of the bicycle, so that the centre of gravity is hence influenced in a positive manner. Furthermore, the components of the gearing mechanism are protected inside the gear housing against the effects of weathering. These gearshift mechanisms currently offer up to 15 gears and an overall transmission ratio of up to 646%. However, the disadvantages of this type of gearing mechanism include their large space requirements and high weight. In order to minimise drive influences, on many bicycles with rear suspension the instantaneous centre of rotation of the axis of rotation of the rear axle suspension lies in close proximity to the bottom bracket. The drive influences are minimised if the axis of rotation lies exactly in the point at which the chain lifts off from the chain wheel. However, the output axes of the gearing mechanisms described here do not lie in close proximity to the bottom bracket, and are instead positioned at a noticeable distance from the latter, so that a completely new layout of the rear suspension needs to be designed in order to minimise the drive influences in turn.

SUMMARY

It is therefore an object of the present invention to provide a transmission unit for a muscle-powered vehicle, which invention does not display the disadvantages described above and in which, in particular, the drive influences are therefore minimised, and which further can be configured to be particularly light and compact and can thus be manufactured cost-effectively.

In order to achieve this object a transmission unit having a through shaft, wherein opposite sides of the through shaft are connectable to respective foot pedals, an output shaft, at least two sub-transmissions, and at least two intermediate shafts is proposed. The transmission unit is characterised in that at least one of the intermediate shafts and/or the output shaft is formed as a hollow shaft which is arranged coaxially to another shaft of the transmission unit.

Advantageous refinements of the invention are derived from the sub-claims.

BRIEF DESCRIPTION OF THE SEVERAL VIEWS OF THE DRAWINGS

The invention is explained below using the drawing, in which:

FIG. 1 shows a side view of a bicycle frame having a multi-speed transmission;

FIG. 2 shows an exploded view of a multi-speed transmission;

FIG. 3 shows a perspective view of a transmission unit;

FIG. 4b shows a sectional view of a transmission unit along the sectional line I-I according to FIG. 4a;

FIG. 5 shows a plan view of the transmission unit according to FIG. 3;

FIG. 6 shows a schematic transmission diagram of the transmission unit according to FIG. 3;

FIG. 9 shows a perspective view of two engageable gear wheels;

FIG. 10 shows an exploded view of the engageable gear wheels according to FIG. 9;

FIG. 11 shows a representation of various shift pins;

FIG. 12 shows a schematic diagram of gearshift processes, and

FIG. 13 shows a schematic representation of a gearshift process with pre-loading mechanism.

DETAILED DESCRIPTION OF THE ILLUSTRATED EMBODIMENTS

Figure 4A:
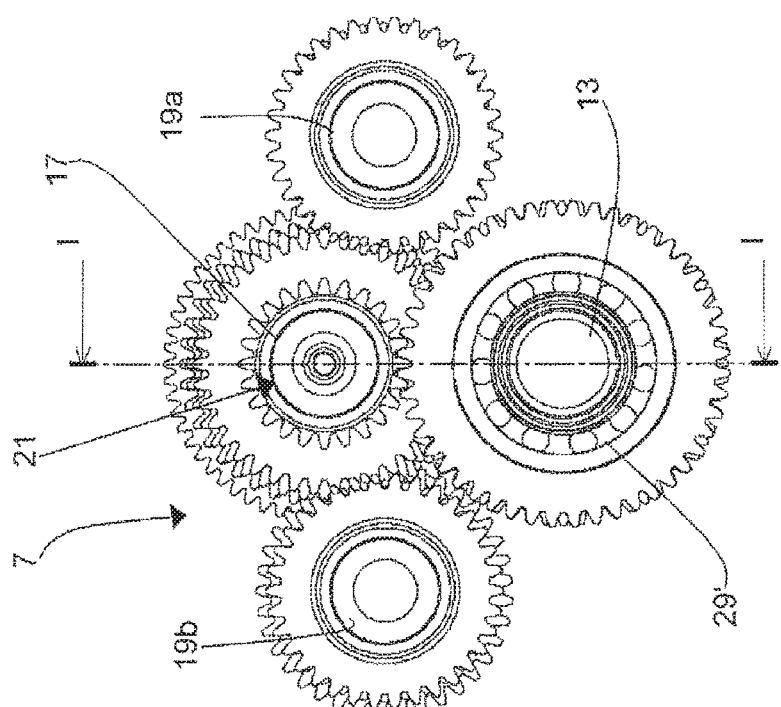
FIG. 4a shows an end-face view of the transmission unit according to FIG. 3.

FIG. 1 shows a side view of a bicycle frame 1 with a multi-speed transmission 3, which has a gear housing 5 in which a transmission unit 7 is arranged. The transmission unit 7 arranged in the gear housing 5 (which is only implied here) is formed as a compact unit and is preferably arranged in a gear cage which is not shown here; this gear cage will be discussed in more detail subsequently. The transmission unit 7 is described here purely by way of example for use on a bicycle, but it can also conceivably be used on any other vehicle which is operated by muscle power.

By virtue of the advantageous bearing arrangement of the transmission unit 7 by means of a gear cage in the gear housing 5, this transmission unit 7 can, for assembly and maintenance purposes, be removed from the gear housing 5 with comparative ease and installed again in the gear housing 5 with equal ease. The gear housing 5 is a fixed part of the bicycle frame 1. A modular construction of the bicycle is thus possible. The bicycle can be retrospectively equipped with different or newer embodiments of the transmission unit 7. For this purpose the gear housing 5 can be opened and the transmission unit 7 can be simply removed and, in particular, exchanged. Foot pedals 9 and 9' are further provided on the multi-speed transmission 3, which pedals interact with a shaft which will be discussed in more detail later on.

FIG. 2 shows an exploded view of a multi-speed transmission 3. Identical reference numbers are used to identify identical components so that, in this respect, reference is made to the description provided for FIG. 1.

Further evident here is a chain wheel 11 which transmits, by means of a chain which is not shown, a torque generated by the transmission unit 7 to the rear wheel of a bicycle.

FIG. 2 further shows the gear cage 12 which is preferably arranged in the gear housing 5. The gear cage 12 serves as a locator for a plurality of gear shafts, bearings, means of shifting/engagement and cable guides and other components of the multi-speed transmission 3. The gear cage 12 can, for example, be formed as follows:

The gear cage 12 comprises at least one, here a total of three, bearing plates 12a, 12b and 12c, which are equipped with bearings L for the location of the gear shafts of the transmission unit 7. If, as is shown here, a plurality of bearing plates are provided, they can be connected to each other by means of hollow spacer sleeves H, wherein the individual bearing plates 12a to 12c are preferably tensioned in relation to each other by means of screwed connections. In FIG. 2 a housing cover 12d is further evident, which will be discussed in more detail. It can be arranged for the outer bearing plate 12a and the housing cover 12d to comprise sealing means which are not shown here and which seal the outer bearing plate 12a, which serves as a housing cover, and the housing cover 12d against the gear housing 5.

Preferably, at least one outer bearing plate 12a of the gear cage 12 is equipped with a circumferential groove 14 which is only implied here and which is fashioned in the bearing plate 12a on the side facing towards the gear housing 5. The profile of the slot 14 corresponds preferably to the cross-sectional contour of the gear housing 5, so that the gear housing 5 can virtually engage in the groove 14 and be mounted there. Preferably, the housing cover 12d arranged opposite the bearing plate 12a also has a groove 14', which is only implied here, which is fashioned in the housing cover 12d on the side facing towards the gear housing 5. The profile of the groove 14' also corresponds preferably to the cross-sectional contour of the gear housing 5 so that the gear housing 5 can virtually engage in the groove 14' and be mounted there. In this way, the housing cover 12d can be tensioned in relation to the gear housing 5.

By virtue of the advantageous bearing arrangement of the transmission unit 7 in the gear cage 12 by means of bearing plates 12a to 12c which have a plurality of bearings L, the transmission unit 7 can, in simple fashion through removal of the housing cover 12d, be taken out as a unit from the gear housing 5 towards the side opposite the housing cover 12d.

In an alternative embodiment of the gear cage 12, it can also be arranged that, in similar fashion to the bearing plates 12a to 12c, the housing cover 12d comprises mountings for means of shifting/engagement, cable guides or bearings L for locating gear shafts or other components of the multi-speed transmission 3. The gear cage 12 can also be formed as a single part, for example a cast part, in which the transmission unit 7 is then mounted.

An embodiment of the multi-speed transmission 3 without gear cage 12 is also conceivable, in which the transmission unit 7 is therefore mounted directly in the gear housing 5, which is then preferably equipped with corresponding bearing mountings.

In the following, the bearing plates 12a to 12c, the spacer sleeves H and the housing cover 12d are described collectively as the gear cage 12.

FIG. 3 shows a perspective view of a transmission unit 7. Identical reference numbers are used to identify identical components so that, in this respect, reference is made to the description provided for the previous figures.

For simplification, the gear cage 12 shown in FIG. 2 is not shown here. The layout of the transmission unit 7 is explained in more detail in the following:

The transmission unit 7 comprises a through shaft 13, which protrudes on both sides from the gear housing 5 which is not shown here. At its ends, the through shaft 13 has a mounting section 15 and 15' respectively for fastening of the foot pedals 9 and 9' which are not shown in FIG. 3. The through shaft 13 serves both as the drive shaft and input shaft of the entire transmission unit 7. The through shaft 13 rotates as soon as the foot pedals 9 and 9' are operated.

The transmission unit 7 has a plurality of intermediate shafts 17, 19*a*, 19*b* and 21 which serve to transmit a torque and to vary the transmission ratios. The intermediate shafts 17 and 21 are preferably formed as hollow shafts which are each arranged coaxially to one other intermediate shaft. In the example shown here, the intermediate shaft 17 which is only implied is arranged coaxially to the intermediate shaft 21.

The intermediate shafts 17, 19*a*, 19*b* and 21 transmit the torque to an output shaft 23 of the transmission unit 7, which is mounted in the gear cage 12 by means of a bearing 29 and which has a mounting section 27 which protrudes on one side from gear housing 5 in order to receive the chain wheel 11 shown in FIG. 2. The output shaft 23 is preferably likewise formed as a hollow shaft which is arranged coaxially to the through shaft 13 in the same manner as the transmission unit 7 shown in FIG. 3. The chain wheel 11 transmits the torque generated by the transmission unit 7 by means of a chain to the rear wheel of the bicycle, wherein the transmission of the torque to the rear wheel does not necessarily have to be performed via a chain drive. Instead, other forms for transmission of the torque, including for example by means of a toothed belt drive, a universal drive or similar, are conceivable. In this case the mounting of the drive shaft 23 is adapted accordingly to the selected form of transmission.

Figure 4B:
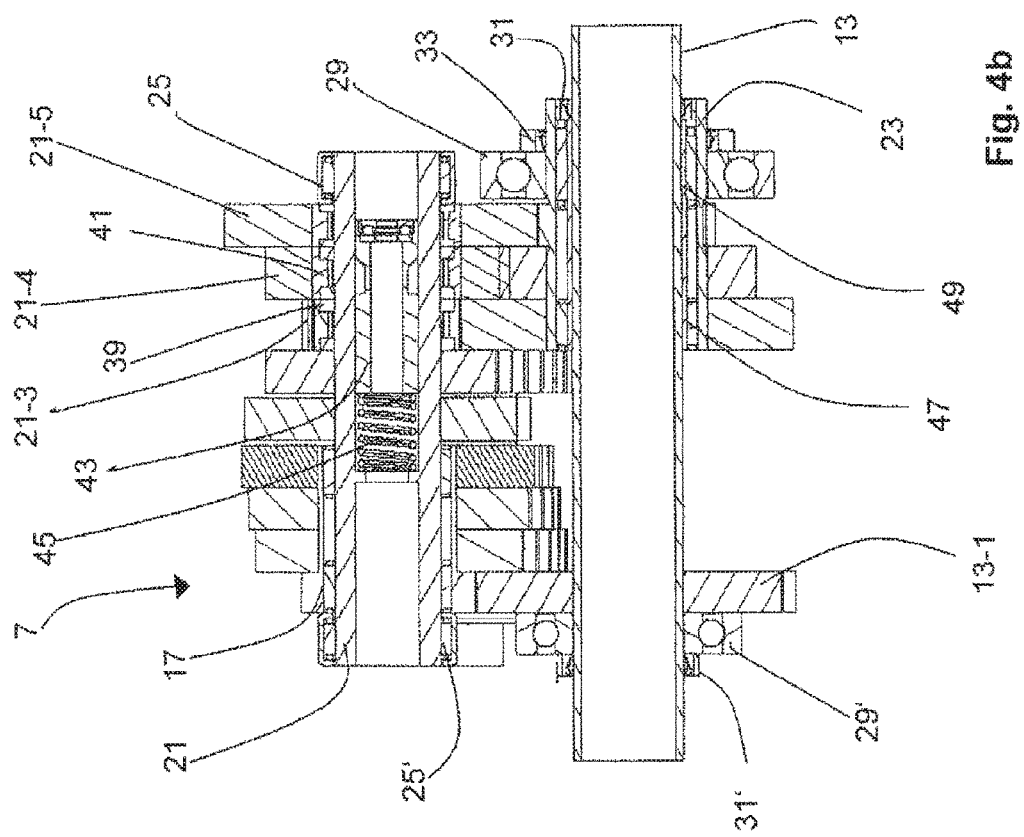

Furthermore, a plurality of bearings can be provided for the purpose of mounting the through shaft 13 in the gear housing 5 and/or the gear cage 12, said bearings not being visible here but being covered in more detail in the description provided for FIG. 4*b*.

The transmission unit 7 is lubricated via an oil bath. In order to seal the transmission unit 7 to the outside, the gear cage 12 has on two sides the housing covers 12*a* and 12*d* shown in FIG. 2 as well as the oil seals 31 and 33. The gear cage 12 can, on one side, already encompass the housing cover in the form of the bearing plate 12*a* with sealing means. The housing cover is thus, by means of the bearing plate 12*a*, virtually already integrated in the gear cage 12, so that no additional housing cover is required here. Through this embodiment the transmission unit 7 is protected against dirt at the same time.

The transmission unit 7 further has bearings 35 and 35' for mounting of the intermediate shaft 19*a* and bearings 37 and 37' for mounting of the intermediate shaft 19*b* at two positions in the gear cage 12.

On the through shaft 13, in the case of the transmission unit 7 shown here a drive gear wheel 13-1 is provided which is mounted for co-rotation on the through shaft 13 by means of a feather key or serration. The drive gear wheel 13-1 interacts via a gear wheel 17-1 with the intermediate shaft 17.

The gear wheel 17-1 is coupled for co-rotation to the intermediate shaft 17, which is merely implied with the reference number 17 in FIG. 3. The gear wheel 17-1 interacts with the drive gear wheel 13-1 as already described above. A rotation of the through shaft 13 on actuation of the foot pedals 9 and 9' effects a rotation of the drive gear wheel 13-1 and, as a result, a rotation of the gear wheel 17-1 and the intermediate shaft 17. Preferably, three further gear wheels 17-2, 17-3 and 17-4 are mounted for co-rotation on the intermediate shaft 17, if a formation of the transmission unit 7 as a 6-speed transmission is intended.

On the intermediate shaft 21, two (output) gear wheels 21-1 and 21-2 are provided which are coupled for co-rotation to the intermediate shaft 21. Furthermore, a further three gear wheels 21-3, 21-4 and 21-5 are provided on the intermediate shaft 21, which are mounted by means of a plain bearing or roller bearing on the intermediate shaft 21 and can be shifted via suitable means of shifting/engagement which will be discussed later in more detail.

On the intermediate shaft 19*a*, rotatably mounted and engageable (output) gear wheels 19*a*-1, 19*a*-2 and 19*a*-3 are provided, which interact with the gear wheels 17-2, 17-3 and 17-4. Accordingly, the intermediate shaft 19*b* has three rotatably mounted and engageable (output) gear wheels 19*b*-1, 19*b*-2 and 19*b*-3. Furthermore, another (output) gear wheel 19*a*-4 is provided on the intermediate shaft 19*a*, which—in contrast to the other output gear wheels of intermediate shaft 19*a*—is not rotatably and shiftably mounted on the intermediate shaft 19*a*, but instead is coupled for co-rotation to the intermediate shaft 19*a* by means of feather keys or serrations or similar. Accordingly, the intermediate shaft 19*b* also has a fourth (output) gear wheel 19*b*-4 which is coupled for co-rotation to the intermediate shaft 19*b*.

Furthermore, gear wheels 23-1, 23-2 and 23-3 are also provided on the output shaft 23, which is arranged here coaxially to the through shaft 13, said gear wheels being coupled for co-rotation to the output shaft 23.

FIG. 4*a* shows once again the transmission unit 7 according to FIG. 3 in an end-face view, and FIG. 4*b* shows a sectional view of the transmission unit 7 along the cut line I-I according to FIG. 4*a*. Identical reference numbers are used to identify identical components so that, in this respect, reference is made to the description provided for the previous figures.

The end-face view according to FIG. 4*a* shows the left-hand end face of the transmission unit 7 shown in FIG. 3. The through shaft 13 and the intermediate shafts 17, 21 and 19*a* and 19*b* are clearly visible.

In FIG. 4*b*, it is also clearly visible that three gear wheels 21-3, 21-4 and 21-5 are mounted on the intermediate shaft 21 by means of plain bearings or roller bearings 39 and configured to be engageable. The term "engaging" or "engageable" is used in the following to convey the meaning that a rotatably mounted gear wheel can be coupled for co-rotation via suitable coupling means to an intermediate shaft, as a result of which a particular gear is engaged. For this purpose an inner ring 41, a shift pin 43 and a spring 45 are provided for realisation of a gear shifting device which will be discussed in more detail later on.

It also becomes clear here that, at its left-hand end, the through shaft 13 is mounted by means of a bearing 29' directly in the gear cage 12, and that the opposite end of said through shaft 13 is mounted by means of two bearings 47 and 49 within the output shaft 23. The through shaft 13 is thus at one end only indirectly mounted in the gear cage 12 via the output shaft 23.

FIG. 5 shows a plan view of the transmission unit 7 according to FIG. 3. Identical reference numbers are used to identify identical components so that, in this respect, reference is made to the description provided for the previous figures.

In FIG. 5, the transmission unit 7 is schematically divided for better understanding into five individual sub-transmissions which together form the transmission unit 7. The individual sub-transmissions [a] to [e], referred to in the following simply as the gearing mechanisms, and in particular the torque flow generated by the gearing mechanisms are described in more detail in the following.

The torque flow within the transmission unit 7 is characterised as follows:

From the through shaft 13, which is coupled to the foot pedals 9 and 9' and hence virtually works as a drive shaft when the foot pedals are operated, the torque is transmitted via a first gearing mechanism [a] to the intermediate shaft 17. Here, transmission takes place via the drive gear wheel 13-1, which is coupled to the through shaft 13 for co-rotation and which interacts with the output gear wheel 17-1, which is coupled for co-rotation to the intermediate shaft 17.

This upstream gearing mechanism [a] serves to reduce the torque. Thanks to the upstream torque reduction, the subsequent gearing components can be made smaller, more lightweight and more cost-effective, and shiftability is also improved.

Starting from this intermediate shaft 17, the torque is then transmitted to a further engageable gearing mechanism [b]. Here, the intermediate shaft 17 virtually represents the input shaft of the gearing mechanism [b]. The gearing mechanism [b] preferably has a plurality of, here two, intermediate shafts 19a and 19b, the gear wheels 19a-1, 19a-2, 19a-3, 19b-1, 19b-2 and 19b-3 of which are driven at the same time by the (input) intermediate shaft 17 of the gearing mechanism [b]. Due to the separation of the gear wheel pairs, i.e. the gears in gearing mechanism [b] onto at least two intermediate shafts 19a and 19b, a particularly compact configuration of the transmission unit 7 is possible.

In the exemplary embodiment, the gearing mechanism [b] has two output shafts 19a and 19b with the (output) gear wheels 19a-1, 19a-2, 19a-3 19b-1, 19b-2 and 19b-3 which are rotatably mounted on them. On each intermediate shaft 19a and 19b, three output gear wheels are rotatably mounted and engageable in each case, which means that the gear wheels can be coupled for co-rotation to the respective intermediate shaft 19a or 19b via suitable means of shifting/engagement. Here, the gearing mechanism [b] has in particular three drive gear wheels 17-2, 17-3, 17-4 and six engageable output gear wheels 19a-1, 19a-2, 19a-3, 19b-1, 19b-2 and 19b-3, thus forming a 6-speed transmission. The six drive gear wheels and three output gear wheels are arranged on two different shafts 19a and 19b. Depending on the status of the means of shifting/engagement, the torque is either transmitted onto the intermediate shaft 19a or onto the other intermediate shaft 19b.

The intermediate shafts 19a and 19b drive the common intermediate shaft 21 of gearing mechanism [c]. The intermediate shaft 21 is also the input shaft for gearing mechanism [d], which on the one hand serves to bring the rotational speed to the required level, and on the other hand serves to realise further gears in the case of a shiftable design of gearing mechanism [d]. If the gearing mechanism [d] is designed to be shiftable, then the number of gears of the transmission unit 7 is obtained by multiplying the number of gears of the shiftable gearing mechanism [b] with the number of gears of the gearing mechanism [d]. In the exemplary embodiment of a transmission unit 7 shown here, the gearing mechanism [b] has 6 gears and the gearing mechanism [d] has 3 gears, as it encompasses three shiftably designed gear wheels 21-3, 21-4 and 21-5, so that the transmission unit 7 shown in FIG. 3 has a total of 18 gears.

Here the output shaft 23 represents the output shaft of the gearing mechanism [d], and at the same time it represents the output shaft of the entire transmission unit 7 and protrudes with a mounting section 27 on one side from the gear housing 5 in the manner described above.

The (drive) gear wheels 19a-4 and 19b-4, which are allocated to the gearing mechanism [c] and which are arranged on the intermediate shafts 19a and 19b, interact with a dedicated output gear wheel 21-1 and 21-2 of gearing mechanism [c], which are coupled for co-rotation to the intermediate shaft 21. It can also be arranged for the drive gear wheels 19a-4 and 19b-4 of gearing mechanism [c] to interact—instead of with one gear wheel respectively—with one common output gear wheel which is coupled for co-rotation to the intermediate shaft 21.

Thanks to the coaxial arrangement of the through shaft 13 in relation to the output shaft 23 which is proposed here, the resulting configuration of the transmission unit 7 is particularly compact and lightweight. In the case of the transmission unit 7 proposed here, it is advantageous that the intermediate shaft 17 simultaneously acts as the output shaft of gearing mechanism [a] and the input shaft of gearing mechanism [b]. Through the formation of the intermediate shaft 17 as a hollow shaft which is arranged coaxially to the intermediate shaft 21, which otherwise acts as the input shaft for gearing mechanism [d], the transmission unit 7 can be further reduced in terms of its size. It is further advantageous that the two intermediate shafts 19a and 19b of gearing mechanism [b] have the same input shaft, namely the intermediate shaft 17 of gearing mechanism [b], and that the intermediate shafts 19a and 19b are also arranged next to the through shaft 13 and the intermediate shaft 17 of gearing mechanism [b], as can be seen from FIG. 3.

Preferably, it is also provided that the (output) gear wheels 21-1 and 21-2 of gearing mechanism [c] are arranged for co-rotation on a common output shaft, namely intermediate shaft 21, which forms the input shaft of gearing mechanism [d]. Finally, the output shaft of gearing mechanism [d] is formed by the output shaft 23 of the transmission unit 7. The output shaft 23 is, as was already described above, formed as a hollow shaft and arranged coaxially to the through shaft 13, as a result of which the configuration of the transmission unit 7 is particularly compact and the output shaft 23 is also located in close proximity to the bottom bracket, so that drive influences are minimised.

It is decisive that at least one of the intermediate shafts 17, 19a, 19b or 21 and/or the output shaft 23 is formed as a hollow shaft which is arranged coaxially to another shaft of the transmission unit 7. As a result, the transmission unit 7 is particularly lightweight and compact to build and can thus be manufactured cost-effectively.

FIG. 6 shows the schematic transmission diagram of a transmission unit 7, as is represented in FIG. 3, and serves here merely for better understanding.

Figure 7:
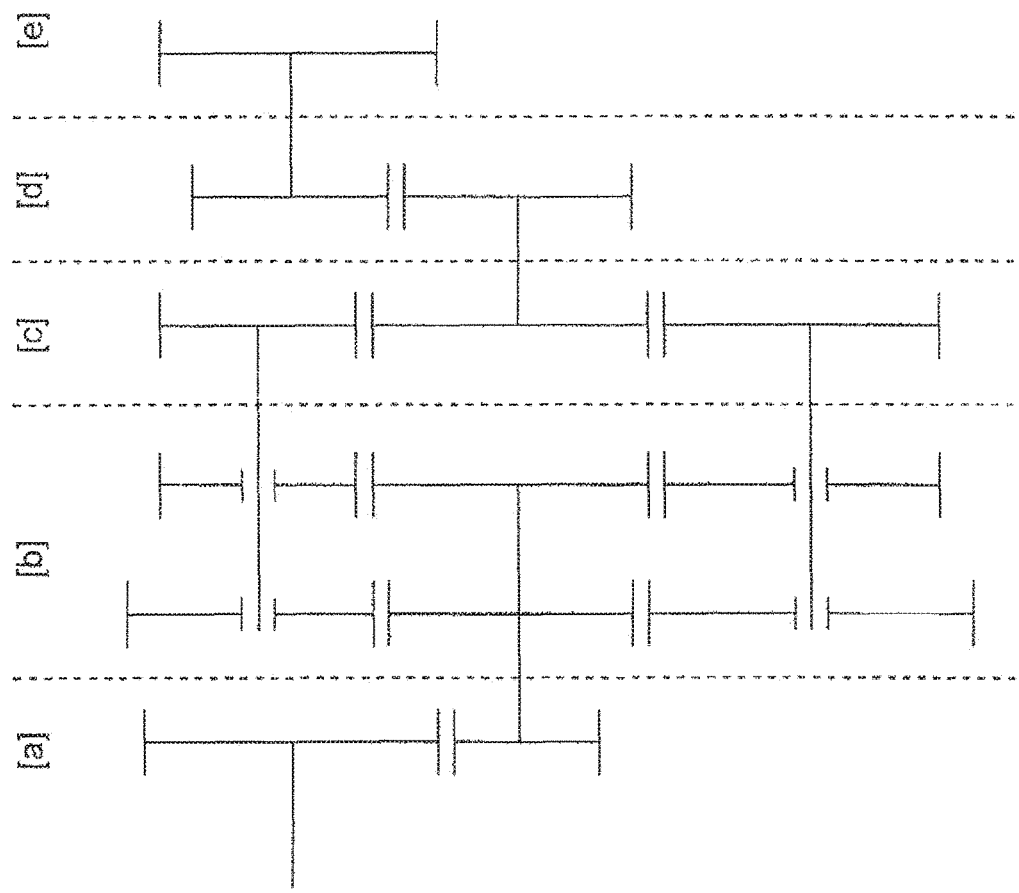
FIG. 7 shows a schematic transmission diagram of a simplified transmission unit.

FIG. 7 shows, in contrast, a schematic transmission diagram of a simplified embodiment of a transmission unit. Here, just like the embodiment of a transmission unit 7 shown in FIG. 3, it is arranged that the drive gear wheel 13-1 of gearing mechanism [a] is arranged on the through shaft 13 and that, at the same time, the intermediate shaft 17 forms the output shaft of gearing mechanism [a] and the input shaft of gearing mechanism [b]. Furthermore, two intermediate shafts 19a and 19b of gearing mechanism [b] are provided which have a common input shaft, namely the intermediate shaft 17 of gearing mechanism [b], and which further are arranged on both sides of the through shaft 13 and the intermediate shaft 17. In contrast to the transmission unit 7 shown in FIG. 6, it is arranged here that the gearing mechanism [b] is formed only as a 4-speed gearing mechanism, thus having four engageable gear wheels on two intermediate shafts and two drive gear wheels. Moreover, the (drive) gear wheels 19a-4 and 19b-4 of the intermediate shafts 19a and 19b are connected to a single output gear wheel. Furthermore, the gearing mechanism [d] has only one gear.

The various embodiments of the transmission unit according to FIGS. 6 and 7 make clear that, in particular, the quantity of engageable gear wheels on the intermediate shafts can vary, depending on how many gears overall the transmission unit is intended to encompass. The quantity of intermediate shafts can also vary accordingly.

In a further embodiment, it can for example be arranged that the output shaft 23 is indeed formed as a hollow shaft, but that said output shaft 23 is arranged coaxially to the intermediate shaft 21 rather than coaxially to the through shaft 13, as a result of which the output shaft 23 is arranged next to the through shaft 13. This embodiment of a transmission unit 7 also produces a particularly compact and lightweight design.

A variant of the transmission unit 7 without upstream torque reduction, i.e. without the gearing mechanism [a], is also conceivable. In this case, the through shaft 13 forms the drive shaft of gearing mechanism [b] at the same time. The further course of the torque transmission is then realised through the two intermediate shafts 19a and 19b as output shafts of gearing mechanism [b] and the following gear stages, as was described in the description of the previous figures.

A further embodiment with an output shaft 23 arranged coaxially to the through shaft 13 is produced if the drive gear wheel 13-1 of gearing mechanism [a] is mounted on the through shaft 13, and the output shaft of gearing mechanism [a], specifically the intermediate shaft 17, simultaneously forms the input shaft of a gearing mechanism [aa] not shown here which is designed as a chain gear, wherein the output shaft of gearing mechanism [aa] is formed as a hollow shaft and arranged coaxially to the through shaft 13. Further, the output shaft of gearing mechanism [aa] is then simultaneously the input shaft of gearing mechanism [b]. In addition, two intermediate shafts of gearing mechanism [b] are provided, which have the same input shaft of the gearing mechanism [b]. In this embodiment it is also preferably arranged that the intermediate shafts are arranged next to the through shaft 13 and the output shaft of gearing mechanism [a]. It is further preferably arranged that the output gear wheels of gearing mechanism [c] are arranged on a common output shaft which is formed as a hollow shaft and is arranged coaxially to the output shaft of gearing mechanism [a]. The output shaft of gearing mechanism [a] is then at the same time the input shaft of gearing mechanism [d], and the output shaft of gearing mechanism [d] is then, finally, the output shaft 23 of the overall transmission unit 7, said output shaft 23 being formed as a hollow shaft and arranged coaxially to the through shaft 13. The output shaft 23 is thus arranged coaxially to the through shaft 13 and projects on one side with a mounting section 27 from the gear housing 5.

One special refinement of the means of shifting/engagement of gearing mechanism [b] and gearing mechanism [d] permits shifting to a higher gear with uninterrupted transmission of the pedalling force and shifting to a lower gear under reduced pedalling force. For this purpose, the means of shifting/engagement are designed as engageable freewheels. A shifting process is characterised in that, during shifting from one gear to another, there exists an intermediate status in which the means of shifting/engagement of both gears are engaged, namely until the gear to be engaged has been frictionally engaged.

It can also be arranged that a further gearing mechanism [aa] is connected behind the gearing mechanism [a] in order to achieve a more compact design and, depending on the design of the gearing mechanism [aa], a correction of the direction of rotation or a change in the direction of rotation. Here, the input shaft of the gearing mechanism [aa] is the output shaft of the gearing mechanism [a], and the output shaft of the gearing mechanism [aa] is then the input shaft of the gearing mechanism [b].

All shafts 13, 17, 19a, 19b, 21 and 23 can be configured as hollow shafts if required.

In particular the output shaft 23 of the transmission unit 7 is preferably formed as a hollow shaft and arranged coaxially to the through shaft 13, as a result of which a particularly compact design is achieved. In similar fashion, a particularly compact design is also obtained if the intermediate shaft 17 of the gearing mechanism [b] is formed as a hollow shaft and arranged coaxially to the intermediate shaft 21 of the gearing mechanism [d].

In cases where gear wheels are fixedly connected to a shaft, they are coupled for co-rotation to the respective shaft either by means of a positive connection or a frictional (non-positive) connection. Inasmuch as the gear wheels can be freely rotated on the shaft, they are ideally mounted via plain bearings or roller bearings on the intermediate shafts. In the case of a coupling of a gear wheel to a shaft for co-rotation, it can be arranged that the gear wheel is rigidly, in particular integrally, connected to the shaft. Moreover, the gear wheels may also be provided with cut-outs in order to save weight.

The thickness of the wall in the region of the base body of the gear wheels can, in order to save weight or take up the least possible installation space, be less than the thickness of the gear wheel in the region of its teeth. In this case, the wall can be arranged anywhere in the region of the gear wheel, for example in the middle, to the right or adjacent to the actual teeth.

The gear wheels can also be designed as multi-part components so that, for example in order to save weight, the base body can be manufactured from a different material to the gear wheel in the region of the external teeth.

The gear wheels can have spur gearing, internal gearing as well as gearing on the side. The side gearing or internal gearing then serves to establish the frictional connection to the coupling means.

On a bicycle with rear suspension, the transmission unit can be formed in such a way that, depending on the type of rear suspension, one of the shafts 13, 19a, 19b, 21 or 23 serves as an axis of rotation for the rear swinging fork. In order to minimise mutual influences between the drive and the suspension, the axis of the corresponding intermediate shaft just lies on the pitch circle of the chain wheel 11 and is congruent to the point at which the chain lifts off the chain wheel (tension side).

In the following, the layout of the example embodiment shown in FIG. 3 of an 18-speed gear change mechanism is explained once more in detail.

An example embodiment as described above having two shiftable gearing mechanisms connected in series is realised as the gearing mechanism [b] with 6 gears and as the gearing mechanism [d] with 3 gears as follows:

The through shaft 13 is mounted on both sides of the gear cage 12 shown in FIG. 2 by means of bearings 29, 29', 47 and 49 shown in FIG. 4b. The output shaft 23 is arranged as a hollow shaft coaxially to the through shaft 13 and protrudes on the chain wheel side from the gear housing 5. On this side the through shaft 13 is mounted within the output shaft 23 on needle bearings 47 and 49. The output shaft 23 itself is mounted in a bearing 29 which is press-fitted into the gear cage 12. The through shaft 13 is mounted on the opposite side directly on a bearing 29' which is press-fitted into the gear cage 12. Above the through shaft 13 an intermediate shaft 21 is mounted on bearings 25 and 25' in the gear cage 12. This intermediate shaft 21 is the output shaft of gearing mechanism [c] and at the same time the drive shaft of the shiftable 3-speed gearing mechanism [d].

Figure 8:
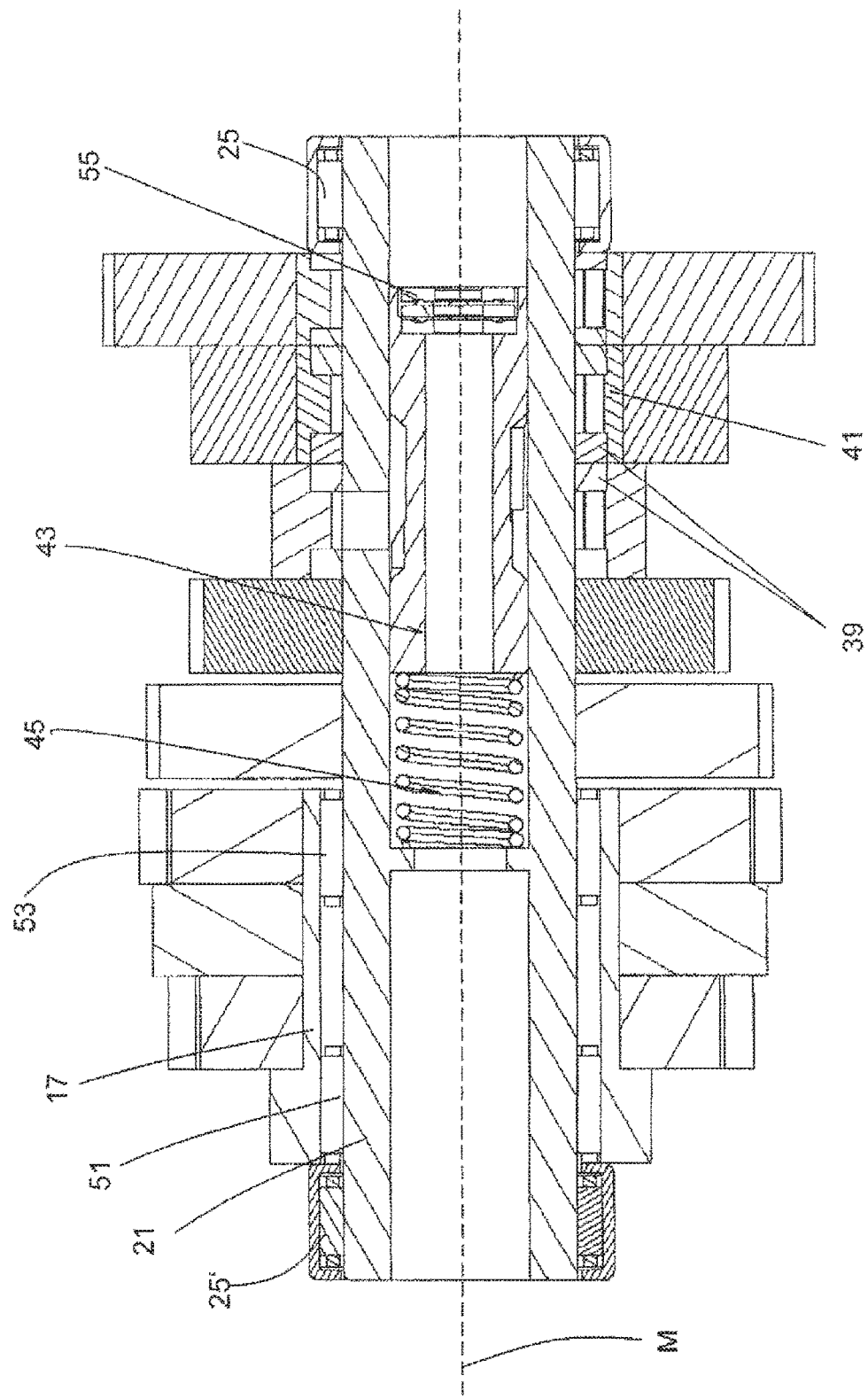
FIG. 8 shows an enlarged sectional view of two intermediate shafts.

FIG. 8 shows an enlargement of a portion of FIG. 4*b*. It can be further seen here that the intermediate shaft 21 forms the axis of rotation of the intermediate shaft 17 which is formed as a hollow shaft, which in turn is mounted on needle bearings 51 and 53 on the intermediate shaft 21. The intermediate shaft 17 is the output shaft of gearing mechanism [a] and the drive shaft of gearing mechanism [b]. On the intermediate shafts 19*a* and 19*b* the output gear wheels 19*a*-1, 19*a*-2, 19*a*-3, 19*b*-1, 19*b*-2 and 19*b*-3 of gearing mechanism [b] are mounted by means of plain bearings or roller bearings. The gear wheels 19*a*-4 and 19*b*-4 of gearing mechanism [c] are also coupled for co-rotation by means of feather keys or serrations to the intermediate shafts 19*a* and 19*b*. These two drive gear wheels 19*a*-4 and 19*b*-4 of gearing mechanism [c] interact with the output gear wheels 21-1 and 21-2 respectively, which are mounted on the intermediate shaft 21 for co-rotation. By virtue of this arrangement the torque is ultimately transmitted to the intermediate shaft 21, depending on which gear wheel is engaged, i.e. coupled for co-rotation, with intermediate shaft 19*a* or 19*b*.

The intermediate shaft 21 is, at the same time, the drive shaft of the shiftable 3-speed gearing mechanism [d]. For this purpose, three gear wheels 21-3, 21-4 and 21-5 are mounted on intermediate shaft 21 by means of plain bearings or roller bearings and engageable, i.e. capable of being coupled with intermediate shaft 21 for co-rotation. The three output gear wheels 23-1, 23-2 and 23-3 of gearing mechanism [d] are connected for co-rotation to the output shaft 23 which is arranged coaxially to the through shaft 13 and formed as a hollow shaft. In this embodiment, this shaft represents the output shaft 23 of the entire transmission unit 7 and protrudes from the gear housing 5. On the portion of the output shaft 23 which lies outside the transmission unit 7, this shaft has a mounting portion 27 for a chain wheel 11. From this chain wheel 11, the rotary motion is transmitted in particular to the rear wheel of a bicycle.

Depending on the status of the means of shifting/engagement, the path of transmission of the torque is therefore realised either via the through shaft 13, the intermediate shaft 17, the intermediate shaft 19*a*, the intermediate shaft 21 and the output shaft 23, or via the through shaft 13, the intermediate shaft 17, the intermediate shaft 19*b*, the intermediate shaft 21 and the output shaft 23.

In this example, the gearing mechanism [a] serves to reduce the input torque at the engageable gearing mechanism [b]. The shiftable 6-speed gearing mechanism [b] is stepped in such a way that a change in gear causes relatively small changes in the overall transmission ratio. By contrast, the shiftable 3-speed gearing mechanism [d] is stepped in such a way that a change in gear causes a larger jump in the overall transmission ratio. Here, the numbers of teeth of the two gearing mechanisms are designed so that there is no overlap between the 18 gears in terms of the overall transmission ratio.

In contrast to current standard outward-lying derailleur gearshift mechanisms, which even with a number of 24 gears or more only offer approximately 15 gears that do not overlap, i.e. which are not redundant, the transmission unit proposed here offers 18 uniformly stepped gears and a wider spread of the overall transmission ratio than gearing units known from the prior art.

The arrangement described in this example of sub-transmissions connected in series having corresponding shafts, gear wheels, bearings and means of shifting/engagement thus permits not only a particularly compact and lightweight design for a bicycle transmission unit, but also a particularly functional design for a bicycle transmission unit.

In particular, the proven division of a derailleur gearshift mechanism into a shift mechanism for the chain wheels having correspondingly large jumps in gear and a shift mechanism for a sprocket pack mounted on the rear axle having correspondingly small jumps in gear is preserved here in terms of functionality as a result of the design of the sub-transmissions [b] and [d].

The mounting of the shafts is not restricted to the bearings described here. The shafts can also have more than two bearings. In particular in the case of the through shaft 13, it would be expedient to provide an additional bearing preferably in its centre.

In a concrete realisation of a transmission unit 7 taking into account specifications relating to installation space and design/construction restrictions, a design for the gear wheels could, for example, take the following form:

In the gearing mechanism [a], a drive gear wheel 13-1 with 60 teeth and an output gear wheel 17-1 with 30 teeth are used for pre-transmission. As a result, the torque is reduced by a half and the rotational speed is doubled.

For the gearing mechanism [b], one drive gear wheel 17-2 with 38 teeth is used for the 1st and 4th gear, and the output gear wheel 19*a*-1 (1st gear), which is arranged on intermediate shaft 19*a*, and the output gear wheel 19*b*-1 (4th gear), which is arranged on the intermediate shaft 19*b*, have 34 teeth. For the 2nd and 5th gears, one drive gear wheel 17-3 with 40 teeth, one output gear wheel 19*a*-2 with 32 teeth for 2nd gear on intermediate shaft 19*a* and one output gear wheel 19*b*-2 with 32 teeth for 5th gear on intermediate shaft 19*b* are used. For the 3rd and 6th gears, one drive gear wheel 17-4 with 42 teeth, one output gear wheel 19*a*-3 with 30 teeth for 3rd gear on intermediate shaft 19*a* and one output gear wheel 19*b*-3 with 30 teeth for 6th gear on intermediate shaft 19*b* are used.

The output gear wheels 19*a*-1, 19*a*-2, 19*a*-3, 19*b*-1, 19*b*-2, 19*b*-3 on the intermediate shafts 19*a* and 19*b* are, as was already explained, rotatably mounted and can, through suitable means of shifting/engagement, be coupled for co-rotation in the direction of rotation, i.e. engaged, with the corresponding intermediate shaft 19*a* and 19*b*. The drive gear wheels 19*a*-4 and 19*b*-4 of gearing mechanism [c] are mounted for co-rotation on the intermediate shafts 19*a* and 19*b*. In this example, a gear wheel 19*a*-4 with 31 teeth is used on the intermediate shaft 19*a* and a gear wheel 19*b*-4 with 37 teeth is used on the intermediate shaft 19*b*. The corresponding drive gear wheels 21-1 and 21-2 of gearing mechanism [c] have 41 and 35 teeth respectively and are mounted for co-rotation on intermediate shaft 21.

The resulting transmission ratios of gearing mechanism [b] and gearing mechanism [c] in the above example should be taken from the following table.

|  | Gearing mechanism [b] | | | Gearing mechanism [c] | | | Gearing mechanism [b] + [c] Transmission ratio | Percent |
|---|---|---|---|---|---|---|---|---|
|  | Drive | Output | Ratio | Drive | Output | Ratio |  |  |
| Gear 1 | 38 |  | 34 | 0.89 | 31 | 41 | 1.32 | 1.18 |  |
| Gear 2 |  | 40 | 32 | 0.80 |  |  |  | 1.05 | 11.84% |
| Gear 3 |  |  | 42 | 30 | 0.71 |  |  | 0.94 | 12.00% |
| Gear 4 | 38 |  | 34 | 0.89 | 37 | 35 | 0.94 | 0.85 | 11.62% |
| Gear 5 |  | 40 | 32 | 0.80 |  |  |  | 0.76 | 11.84% |
| Gear 6 |  |  | 42 | 30 | 0.71 |  |  | 0.68 | 12.00% |

The specific choice of number of teeth has the advantageous consequence that the two intermediate shafts 19*a* and 19*b*, on which the output gear wheels 19*a*-1, 19*a*-2, 19*a*-3, 19*b*-1, 19*b*-2 and 19*b*-3 of gearing mechanism [b] are arranged, can be formed of identical design, which in turn results in a more cost-effective construction of the transmission unit 7.

Following on from the shiftable 6-speed gearing mechanism [b] and the gearing mechanism [c], the shiftable 3-speed gearing mechanism [d] is described as follows purely by way of example:

| | Gearing mechanism [d] | | |
|---|---|---|---|
| | Drive gear wheel | Output gear wheel | Transmission ratio |
| Gear 1 | 30 | 60 | 2.00 |
| Gear 2 | 44 | 46 | 1.05 |
| Gear 3 | 59 | 31 | 0.53 |

The gearing mechanism [a], gearing mechanisms [b]+[c] and gearing mechanism [d] thus produce in their logical sequence the following overall transmission ratio table:

| | Gearing mechanism [a] | Gearing mechanisms [b] + [c] | Gearing mechanism [d] | Res. transmission ratio | Percent |
|---|---|---|---|---|---|
| | Transmission ratio | | | | |
| Gear 1 | 0.5 | 1.18 | 2.00 | 1.18 | |
| Gear 2 | | 1.05 | | 1.05 | 11.84% |
| Gear 3 | | 0.94 | | 0.94 | 12.00% |
| Gear 4 | | 0.85 | | 0.85 | 11.62% |
| Gear 5 | | 0.76 | | 0.76 | 11.84% |
| Gear 6 | | 0.68 | | 0.68 | 12.00% |
| Gear 7 | | 1.32 | 1.05 | 1.32 | 9.23% |
| Gear 8 | | 1.05 | | 0.55 | 11.84% |
| Gear 9 | | 0.94 | | 0.49 | 12.00% |
| Gear 10 | | 0.85 | | 0.44 | 11.62% |
| Gear 11 | | 0.76 | | 0.40 | 11.84% |
| Gear 12 | | 0.68 | | 0.35 | 12.00% |
| Gear 13 | | 1.18 | 0.53 | 0.31 | 13.61% |
| Gear 14 | | 1.05 | | 0.28 | 11.84% |
| Gear 15 | | 0.94 | | 0.25 | 12.00% |
| Gear 16 | | 0.85 | | 0.22 | 11.62% |
| Gear 17 | | 0.76 | | 0.20 | 11.84% |
| Gear 18 | | 0.68 | | 0.18 | 12.00% |
| | | | | Overall transmission ratio | 666.65% |

The drive gear wheels 21-3, 21-4 and 21-5 of gearing mechanism [d] are rotatably mounted on the intermediate shaft 21. By means of suitable means of shifting/engagement these can be coupled for co-rotation with the intermediate shaft 21. The output gear wheels 23-1, 23-2 and 23-3 are mounted for co-rotation on the output shaft 23, which is formed as a hollow shaft, and are further arranged coaxially to the input/through shaft 13.

Gear 1 of the 3-speed gearing mechanism [d] has, for example, one drive gear wheel 21-3 with 30 and one output gear wheel 23-1 with 60 teeth, gear 2 has one drive gear wheel 21-4 with 44 and one output gear wheel 23-2 with 46 teeth, and gear 3 has one drive gear wheel 21-5 with 59 and one output gear wheel 23-3 with 31 teeth. This produces the following transmission ratios for the 3-speed gearing mechanism [d]:

As can be seen from the overall transmission ratio table, the gradation between all gears is virtually constant when expressed as a percentage, and this results in no redundancy in the resulting transmission ratios. From this and due to the large number of gears, a very large spread of 666.65% is obtained for the transmission unit 7. Thanks to these properties, the transmission unit 7 offers the rider the choice of the optimum transmission ratio at all times, as a result of which the muscle power can be optimally converted.

Other embodiments of transmission unit 7 are also conceivable, in which the spread differs from the one described above. For example, a transmission unit 7 is conceivable which has a spread of approximately 673%.

In comparison to a 14-speed geared hub for use in the rear wheel, which is known for example from DE 197 20 796 B4, the transmission unit described here offers more gears and, in addition, a larger overall transmission ratio. Further advantages over the known 14-speed geared hub include in particular the advantageous, low-lying arrangement of the transmission unit 7 in substantially the centre of the bicycle. As a result, not only the mass of rotating components, and on bicycles with rear suspension the mass of the unsprung components, is reduced, but the centre of gravity of the bicycle is also shifted substantially towards the centre of the bicycle. The ride characteristics, particularly with regard to ride safety and ride comfort, are influenced particularly advantageously as a result.

In comparison to a further embodiment of a bicycle gearing mechanism located in the vicinity of the bottom bracket having 15 "usable" gears, such as the embodiment known from DE 10 2004 045 364 B4, the transmission unit 7 proposed here offers significantly more consistent steps in terms of the gradation between gears, as well as more gears and, in addition, a larger usable overall transmission ratio.

In comparison to a gearing mechanism known from, for example, DE 10 2004 045 364 B4, the transmission unit 7 described here makes a significantly more compact design possible. This is enabled in particular through the design of gearing mechanisms [b] and [c], which is characterised by the simultaneous actuation of at least two intermediate shafts (here: 19a and 19b) through an intermediate shaft 17 and the combination of the intermediate shafts 19a and 19b onto one output shaft 21. Similarly, the formation of the drive shaft 17 of gearing mechanism [b] as a hollow shaft, which is arranged coaxially to the drive shaft 21 of gearing mechanism [d], and the design of output shaft 23 as a hollow shaft, which is arranged coaxially to through shaft 13, contribute to the compact design of the multi-speed gearing mechanism 3.

Furthermore, in comparison to DE 10 2004 045 364 B4, the output shaft 23 is, through the coaxial arrangement of intermediate shafts proposed here, arranged not next to but coaxially to the bottom bracket 9, as a result of which, as described at the outset, conventional bicycle frame concepts with rear suspension can continue to be used without any modification of the location of the chain drive axes and hence without any change in the drive influences.

The design of gearing mechanism [b] makes it possible for intermediate shafts 19a and 19b to have couplings (not shown here in any more detail), as a result of which gear changing without interruption of the pedalling force is possible, even in low gears. For this purpose, the even gears are provided on the one intermediate shaft 19a and the odd gears are provided on the other intermediate shaft 19b. During operation of the transmission unit, the coupling of at least one intermediate shaft 19a or 19b is closed, and the other coupling of the respective other intermediate shaft is open. The next gear is engaged without interruption of the pedalling force through engagement of the gear on the intermediate shaft, the coupling of which is open, and subsequent, simultaneous closing of the one and opening of the other coupling. This means that the design of gearing mechanism [b] with a plurality of intermediate shafts 19a and 19b permits an expansion of the transmission unit 7 with couplings which can be engaged simultaneously. It is, for example, conceivable to equip the intermediate shafts 19a and 19b each with one coupling which establishes the flow of torque by means of a frictional connection. If now, for example, the odd gears 1, 3 and 5 are provided on the one intermediate shaft 19a and the even gears 2, 4 and 6 are provided on the other intermediate shaft 19b, then it is possible to shift to a higher or lower gear without interruption of the pedalling force. For example, when 3rd gear is engaged, the coupling on the associated intermediate shaft 19a is closed and therefore the torque is being transmitted via this gear, it is already possible to select gear 2 or 4 on the other intermediate shaft 19b. Just by opening the one coupling and simultaneously closing the other coupling it is thus possible to shift without any interruption of the pedalling force into the gear selected on the other respective shaft.

The transmission unit 7 offers a further decisive advantage: in the embodiment described here, by virtue of the separation into a gearing mechanism having small jumps in transmission ratio, specifically gearing mechanism [b], and a gearing mechanism having large jumps in transmission ratio, specifically gearing mechanism [c], it is possible to shift directly with only one change of gear from a "lighter" to a significantly "heavier" gear. For example, it is possible to shift directly from gear 3 to gear 9 without having to shift sequentially through the gears. This has a particularly positive effect in the event of a sudden change in the climbing resistance, for example when riding through a dip or when cycling over a crest.

The coupling means are described in more detail in the following.

The gears of the two shiftable gearing mechanisms [b] and [d] can be shifted by means of various coupling means, such as claw couplings or tooth couplings, but also by means of (engageable) freewheels or similar.

The means of shifting/engagement for gearing mechanism [b] and gearing mechanism [d] can be arranged both within the intermediate shafts 19a, 19b and 21, which are formed as hollow shafts, or outside these intermediate shafts. One conceivable embodiment would be, for example, to have the means of shifting/engagement formed as engageable freewheels arranged within the intermediate shafts. For the realisation of the means of shifting/engagement as engageable freewheels, the engageable gear wheels 19a-1, 19a-2, 19a-3, 19b-1, 19b-2, 19b-3, 21-3, 21-4 and 21-5 are equipped with an internal gearing in which at least one freewheel body which is not shown here and is arranged in the intermediate shaft can be brought to engage.

Here, the freewheel body is preloaded by means of a spring and releases the gearwheel when the latter displays a lower angular velocity than the intermediate shaft. However, if the gear wheel is rotating more quickly than the intermediate shaft then the freewheel body engages in the internal gearing of the gear wheel, and thus establishes a frictional connection between the gear wheel and the shaft. By means of a shifting pin 43, which is arranged here as shown in FIG. 8 by way of example within the intermediate shaft 21, the freewheel bodies can be engaged or disengaged.

FIG. 9 shows a perspective representation of two gear wheels and FIG. 10 shows an exploded view of the gear wheels according to FIG. 9. Identical reference numbers are used to identify identical components so that, in this respect, reference is made to the description provided for the previous figures.

A concrete embodiment of the means of shifting/engagement, for example for gearing mechanism [b], could look as follows:

All engageable gear wheels 19a-1, 19-2, 19-3, 19b-1, 19b-2 and 19b-3 are designed in the same manner as the gear wheel 57 or 57a shown in FIG. 9. The gear wheels 57 and 57a have an inner ring 41 and a toothed ring 61, wherein the inner ring 41 is furnished with an internal gearing 59. By virtue of the multi-part realisation of the gear wheels 57 and 57a, the inner ring 41 can be manufactured from a different, for example harder, material than the toothed ring 61. The internal gearing 59 of the inner ring 41 is preferably formed in such a way that the freewheel body, depending on the relative speed of the gear wheel 57, 57a in relation to the intermediate shaft, either blocks said gear wheel 57, 57a, so that the intermediate shaft rotates at the same speed as the gear wheel, or releases it.

If the gear wheel 57, 57a rotates more slowly than the respective intermediate shaft, then the spring-loaded freewheel bodies slide away over the oblique part of the inner ring 41, but if the gear wheel 57, 57a rotates more quickly than the intermediate shaft, then the freewheel bodies engage in the internal gearing 59 and the shaft is driven at the rotational speed of the gear wheel. This means that, during a gear change to a higher gear, i.e. a gear with a higher rotational speed of the output gear wheel, the freewheel bodies engage in the internal gearing 59 of the gear wheel and the gear is thus engaged. It is therefore possible to shift to a gear with a lower transmission ratio without interruption of the pedalling force. During a gear change to a lower gear, i.e. a gear with a lower rotational speed of the output gear wheel, the freewheel bodies initially slide away over the oblique part of the internal gearing 59. The gear is only engaged when the shaft speed has been reduced to the speed of this gear wheel, i.e. the higher gear has been disengaged.

The gear wheel 57 further comprises plain bearing elements 39 on both sides next to the inner ring 41, which provide a bearing for and support the gear wheel 57 on the shaft. If the plain bearing elements 39 have a smaller internal diameter than the inner ring 41, then they can perform the axial guidance of the gear wheel 57 at the same time. For this purpose the freewheel bodies project in a slightly raised position from the intermediate shaft even when disengaged. Furthermore, it can be arranged for the combined width of the plain bearing elements 39 and the inner ring 41 to be larger than the width of the toothed ring 61. As a result, the plain bearing elements 39 act on both sides of the gear wheel 57 additionally as thrust elements for neighbouring gear wheels. These may, however, also be realised through separate washers between the gear wheels.

The means of shifting for engagement and disengagement, or for coupling and uncoupling of the gear wheels, are not limited to engageable ratchet freewheels, and all other types of means of shifting/engagement can also be used, including for example claw couplings, toothed couplings, clamping roll freewheels and/or clamping body freewheels. It is also, for example, conceivable to have engageable freewheels having freewheel bodies which are arranged in the gear wheels.

In the case of gearing mechanism [d], the design of the means of shifting/engagement is similar. The difference to the above-described means of shifting/engagement for gearing mechanism [b] is that shifting/engagement here does not take place on the output shaft, specifically the intermediate shafts 19a or 19b, and therefore the gear wheel does not drive the shaft, but that shifting/engagement takes place on the drive shaft, specifically the intermediate shaft 21, so that the intermediate shaft 21 drives the respective engaged gear wheel 21-3, 21-4 or 21-5. Here again it is possible to shift to the gear having the lower rotational speed of the gear wheel without interruption of pedalling force, albeit on the drive side of the gearing mechanism [d], which corresponds similarly to gearing mechanism [b] to a gear with a smaller transmission ratio.

The inner gearing 59 of the gear wheel 57, 57a does not necessarily need to be provided in the middle of the gear wheel, and instead the inner ring 41 furnished with an inner gearing 59 can also be arranged next to the gear wheel 57, 57a, so that the plain bearings or roller bearings can be provided within the gear wheel 57, 57a.

The preferably two-sided mounting of the gear wheels is not restricted to plain bearing elements 39, and instead other types of bearings such as a ball bearing 63 or any other type of rolling bearing can be used.

FIG. 11 shows several embodiments of shift pins which are described in more detail in the following. Identical reference numbers are used to identify identical components so that, in this respect, reference is made to the description provided for the previous figures.

The shift pins 65 and 65a shown in FIG. 11 interact with freewheel bodies not shown here. A freewheel of the type mentioned here is preferably formed as follows: the freewheel bodies are displaceably (rotatably) arranged within the hollow shafts 19a, 19b and 21 in cutouts 67 of a shift pin 65, 65a. At least one freewheel body is assigned to every gear wheel arranged on the intermediate shaft, and one freewheel body is further assigned to preferably a cutout 67 in the shift pin 65, 65a. The freewheel body is, at its side facing the inner gearing 59, formed in such a way that it can positively engage in the inner gearing 59 of the gear wheels 57 and 57a. On its opposite side the freewheel body has an elevated part facing in the direction of the centre axis M. The freewheel body is aligned by means of a torsion spring or by means of a spring ring in relation to the gear wheel and to the intermediate shaft so that it, in order to be able to engage in the inner gearing 59 of the gear wheel 57, 57a, protrudes beyond the circumferential surface of the intermediate shaft. In the following only the use of the torsion spring is discussed, but the same applies if spring rings are used instead of torsion springs.

The freewheel body is thus preloaded by means of a spring and releases the gear wheel if it has a larger angular velocity than the intermediate shaft. However, if the gear wheel rotates more slowly than the intermediate shaft, then the freewheel bodies engage in the inner gearing 59 of the gear wheel and thus provide a positive connection between the gear wheel and the intermediate shaft.

Within the hollow shaft, the shift pin 65, 65a shown in FIG. 11 and which is axially displaceable in the direction of the centre axis M of the intermediate shaft and which is furnished with cutouts 67, wherein one cutout 67 is preferably assigned to one gear wheel, is provided. The centre axis M of the respective intermediate shaft is thus at the same time the centre axis of the shift pin. The shift pin 65, 65a rotates at the same speed as the respective intermediate shaft in which the shift pin 65, 65a is arranged. If the cutout 67 of a shift pin 65, 65a is axially displaced in relation to a freewheel body arranged in the circumferential surface of the intermediate shaft, then the shift pin 65, 65a exercises a force on the elevated part of the freewheel body on its side facing the centre axis M thereof and thus displaces the freewheel body so far into the interior of the intermediate shaft that the freewheel body only protrudes minimally above the circumferential surface of the intermediate shaft, specifically only so far that the freewheel body only just fails to engage in the internal gearing 59 of the gear wheel 57, 57a.

By virtue of the fact that the protruding part of the freewheel body is arranged between the plain bearing discs 39 or between the ball bearing 63, the axial position of the gear wheel 57, 57a on the intermediate shaft is virtually defined by means of the part of the freewheel body which protrudes above the circumferential surface of the intermediate shaft. If the shift pin 65, 65a is axially displaced in the intermediate shaft in such a way that the cutout 67 of the shift pin 65, 65a is located directly underneath a freewheel body which is assigned to a gear wheel, then the shift pin 65, 65a no longer exercises any force on the elevated part of the freewheel body and the freewheel body is displaced and/or rotated outwards, i.e. further beyond the circumferential surface of the intermediate shaft, as a result of the spring force of the torsion spring. As a result, the freewheel body can engage in the internal gearing 59 of the gear wheel and couple the gear wheel, as the case may be, with the intermediate shaft.

By axially shifting back and forth the shift pin 65, 65a which has corresponding cutouts 67, the freewheel bodies can thus be engaged with or disengaged from the internal gearing 59 of the gear wheel 57, 57a, and the gears of the gear wheels arranged on the shaft can be engaged or disengaged. So that the shift pin 65, 65a which co-rotates with the intermediate shaft can be externally actuated, the rotational motion of the shift pin is uncoupled preferably by means of an axial bearing 55.

Two cutouts 67 in the shift pin 65, 65a, which are assigned to two neighbouring gear wheels, are preferably formed in such a way that a range is provided in which both freewheel bodies can be displaced outwards in the direction of the gearing 59 and can thus engage in their respective assigned gear wheel. In this status the freewheel bodies are virtually "activated". As soon as the shift pin 65, 65a is located in an axial position within the intermediate shaft, in which this region is assigned to both of the neighbouring freewheel bodies when viewed in an axial direction, the gear wheel which is rotating at a higher speed is engaged and the slower gear wheel is in a freewheeling state, in which the freewheel body slides away over the oblique parts of the internal gearing 59. By virtue of this intermediate status it is ensured that, under further displacement of the shift pin 65, 65a, at least one freewheel body remains engaged and thus a neutral gear in the gearing mechanism is avoided.

FIG. 12 shows a schematic diagram of the axial position of the shift piston 65 in the intermediate shaft in relation to the freewheel bodies F1, F2 and F3 which are only schematically represented. Identical reference numbers are used to identify identical components so that, in this respect, reference is made to the description provided for the previous figures.

FIG. 12 shows a schematic diagram of the shift pin 65 and the freewheel bodies F1, F2 and F3. In the top row the shift pin 65 is arranged in an axial position in the intermediate shaft, in which the cutout 67' is arranged directly underneath the freewheel body F1. As a result, the freewheel body F1 can engage in the internal gearing 59, so that 1st gear is engaged.

If, starting from the shift status labelled "1st gear engaged" in FIG. 12, the gear is to be changed from 1st gear to 2nd gear, the shift pin 65 is displaced to the right in the intermediate shaft until the cutout 67" is located in the region of the freewheel body F2, which is labelled "Intermediate stage (2nd gear engaged)" in FIG. 12. The cutout 67', in which the freewheel body F1 is arranged, must further be formed wide enough in an axial direction so that the freewheel body F1, after the axial movement of the shift pin 65, is also still "active", i.e. is still in engagement with internal gearing 59. In this shift position of shift pin 65 both the freewheel body F1 and the freewheel body F2 are in an "active" position, so that the more quickly rotating gear wheel is coupled by means of the freewheel body to the shaft, i.e. 2nd gear is engaged.

By virtue of this intermediate status, in which at least two freewheel bodies are "activated", idling of the transmission unit in neutral during a gear shift is avoided. If, starting from the intermediate status, the shift pin 65 is further axially displaced, here to the right, in the intermediate shaft, then the freewheel body F1 is virtually deactivated and the shift status labelled "2nd gear engaged" in FIG. 12 occurs.

The same applies to a gear change starting from 2nd gear into the shift status labelled "Intermediate stage (3rd gear engaged)" in FIG. 12 and from there into the shift status "3rd gear engaged". It is decisive that the width of the cutouts 67', 67" and 67''', when viewed in an axial direction, are coordinated in such a way that, under axial displacement of the shift pin 65, an intermediate stage is reached in which at least two freewheel bodies are activated at the same time.

By virtue of the design of the means of shifting/engagement described here, the process of shifting to a higher gear, i.e. a gear with a smaller transmission ratio, is possible without interruption of pedalling force in both gearing mechanisms [b] and [d]. On account of the fact that, during downshifts to a lower gear, i.e. a gear with a higher transmission ratio, the freewheel ratchets remain engaged in the slower-rotating gear wheel because of the friction connection, the rider will need to reduce the pedalling force applied during the down shift.

Through a special design of the freewheel bodies, in particular the form of the part of the freewheel body which engages in the internal gearing 59 of the gear wheel, and a special design of the cutouts 67 in the axially displaceable shift pin 65a and the corresponding elevated parts on the freewheel bodies, the shifting force which needs to be applied by the rider via a gear lever in order to axially displace the shift pin under load despite the engagement of the gear wheel, i.e. to engage a lower gear, is minimised.

A schematic diagram of the design of the shift pin 65 for shifting of the 3-speed gearing mechanism [d] is shown in FIG. 11. The cutouts 67 in the shift pin 43 have, depending on the profile, oblique surfaces 69 on the sides. As a result of the oblique surfaces 69, a freewheel body can be rotated against the clamping effect between the freewheel body and the internal gearing 59 of the gear wheel and hence decoupled. In one embodiment of the shift pin, in order to save installation space and prevent one-sided weakening of the shaft in which the freewheel bodies are mounted, it is arranged that the cutouts 67 and also the corresponding freewheel bodies mounted in the intermediate shaft are positioned in offset locations around the shaft circumference.

The design of the shift pin in the 6-speed gearing mechanism [b] is slightly modified. Here, two intermediate shafts 19a and 19b are provided, each with three engageable output gear wheels 19a-1, 19a-2, 19a-3 and 19b-1, 19b-2, 19b-3. On account of this special design it is necessary for a shift status to be provided in which all gear wheels, for example 19a-1, 19a-2, 19a-3 of an intermediate shaft 19a are decoupled, while one gear wheel, for example 19b-1, is coupled for co-rotation with the other intermediate shaft 19b. Consequently, the shift pin must not have vertical stops 71 in both directions as shown for the shift pin 65, i.e. stops which lie in a plane aligned perpendicularly to the centre axis M of the shift pin 65, and instead it must comprise on each side respectively one additional oblique surface 69', as is the case in the shift pin 65a shown in FIG. 11. If the cutouts 67 on both sides have oblique surfaces 69 and 69', then the shift pin 65a can be axially displaced far enough in the intermediate shaft and hence relatively to the freewheel bodies for all gear wheels to be decoupled from their respective shaft.

The axially displaceable shift pin 65, 65*a* is preferably actuated by means of at least one gear cable not shown here. In the event that the actuation of the shift pin 65, 65*a* is performed by means of only one gear cable, the shift pin 65, 65*a* is rotated back or, depending on the design of the spring mechanism, pulled back to its starting position by means of a spring 45 contained in the hollow shaft 19*a*, 19*b* or 21. In FIG. 8 an embodiment is provided in which the shift pin is pulled back into its starting position by means of a spring 45. The shift pin 65, 65*a* is then displaced against the spring force by means of the gear cable into the corresponding axial positions in the intermediate shaft. Since the shift pin 65, 65*a* performs a rotary movement together with the hollow shaft, the gear cable is ideally decoupled from the rotary movement of the shift pin by means of an axial bearing 55. The gear cable can then be guided out of the gear housing 5 towards a gear lever device.

The actuation of the two intermediate shafts 19*a* and 19*b* of gearing mechanism [b] can also be performed together already inside the transmission unit 7. To do this, the shift pins 65 and 65*a* are coupled by means of a cable, linkage, chain or similar device not shown here. In this case it is also not absolutely necessary to have a dedicated spring 45 for each intermediate shaft 19*a* and 19*b*, and instead a single, correspondingly longer spring can be used if the two shift pins are coupled.

A different possible embodiment is designed as follows: the freewheel bodies have, on one side of their axis of rotation, a shaped part as described above for engagement in the internal gearing 59 of the gear wheels 57 and 57*a*. Here, however, an elevated part in the direction towards the centre axis M is provided not on the other side of the axis of rotation but on the same side of the axis of rotation as the freewheel body. The freewheel body is equipped with a torsion spring in such a way that the freewheel body is pressed in the direction towards the centre axis M. Here again, an axially displaceable shift pin 65*b* is located inside the hollow shaft 19*a*, 19*b*, 21 in which the freewheel bodies are mounted, said shift pin 65*b* being furnished not with cutouts as before but with elevated parts 71. If the shift pin 65*b* is located in an axial position in the intermediate shaft in which an elevated part 71 is positioned directly underneath a freewheel body, then the latter is displaced outwards into the internal gearing 59 of the gear wheel 57, 57*a*, and a frictional connection is thus established between the intermediate shaft and the gear wheel.

It is preferably arranged that the elevated parts 71 on the axially displaceable shift pin 65*b* are formed as spring-loaded balls. Through this special arrangement it is possible that, in principle, from any arbitrarily engaged gear any other arbitrary gear can be engaged through axial displacement of the shift pin 65*b*. Here, the elevated parts 71, which are realised as spring-loaded balls, of shift pin 65*b* can slide underneath and beyond the freewheel bodies by pressing the balls into the shift pin 65*b* and thus do not prevent the axial motion of the shift pin 65*b*.

Through this special design of the shift pin 65*b* and the freewheel bodies, a gear shift process takes the following form: during a gear change to a higher gear, i.e. a gear with a lower transmission ratio, the gear engages as soon as the corresponding spring-loaded ball is arranged in shift pin 65*b* underneath the corresponding gear wheel. As soon as the gear has engaged, the previously engaged gear is in freewheel mode, and the freewheel bodies are rotated by means of the torsion spring in the direction towards the centre axis M and are thus decoupled from the gear wheel.

During a gear change to an arbitrary lower gear, i.e. a gear with a higher transmission ratio, for example from 6th gear to 2nd gear, the gear is initially pre-selected by the rider by means of the displacement of the shift pin 65*b*, and the spring-loaded ball is now underneath the corresponding freewheel body. The corresponding gear wheel (2nd gear) is in freewheel mode. If the pedalling force is now briefly interrupted, the freewheel body of the previously engaged gear (here 6th gear) is rotated inwards by means of the torsion spring, the gear wheel is released and the gear wheel (2nd gear), under the freewheel body of which the spring-loaded ball of the shift pin 65*b* is located, is engaged. The brief interruption of pedalling force is required here as, on account of the clamping effect between the freewheel body and the internal gearing 59 of the gear wheel (6th gear), the torque of the torsion spring and/or spring ring is not sufficient to rotate the freewheel body inwards.

A further special technical feature relates to the arrangement of the freewheel bodies and the design of the internal gearing 59 of the gear wheels 57 and 57*a*. For each gear wheel, there may be more than one freewheel body per gear wheel mounted in the wall of the hollow shaft. Here, the freewheel bodies can be arranged in such a way that they engage in the internal gearing 59 of the gear wheel at the same time. As a result, the tangential forces which are to be transferred are shared between the corresponding freewheel bodies. However, the freewheel bodies can also be arranged in such a way that they only just fail to engage at the same time in the internal gearing 59. As a result, the rotational angle of the gear wheel after which at least one freewheel body at otherwise identical internal gearing 59 engages in the latter can be reduced.

In the embodiment of the transmission unit 7 shown in FIG. 3, the following design of the freewheel bodies and the internal gearing 59 is shown by way of example: two freewheel bodies are arranged offset by 180° in the shafts 19*a*, 19*b* and 21. The internal gearing 59 of the respective gear wheel has 15 teeth at its circumference, i.e. one tooth every 24°. Due to the odd number of teeth and the even number of freewheel bodies, in this example a freewheel body engages in the internal gearing 59 not every 24°, but at the latest every 12°. As a result, gear shift processes with particularly short reaction times are possible.

One special feature of the transmission unit 7 proposed here is further the fact that the gearing mechanism [d] is shifted on the drive side, specifically by means of the intermediate shaft 21. As a result, the maximum engageable torque for the gears in the 3-speed gearing mechanism [d] is constant and the means of shifting/engagement can be dimensioned identically.

As already described, the shift pin can be linearly displaced and thus actuates the individual freewheel bodies in the manner shown in FIG. 12. As an alternative to a linear movement, it is also conceivable to move the shift pin exclusively rotationally, or to move it radially instead of axially. The logic of the gear shift layout similar to the one shown in FIG. 12 is preserved. In comparable fashion to a camshaft, the shift pin is then rotated in defined fashion within the intermediate shaft and actuates the individual freewheel bodies by means of its cams. To do this, the shift pin needs to be additionally rotated in relation to the rotating intermediate shaft. A guide slot is provided for this purpose in the intermediate shaft, in which guide slot a second pin, specifically a guide pin, is guided by means of a further guide pin. The slot is designed in such a way that, under an axial displacement, or under a tensile force in the axial direction, the guide pin performs a defined rotation around its longitudinal axis relatively to the intermediate shaft. The guide pin is arranged in such a way that it can be axially displaced in relation to the shift pin or cam pin by means of a driving profile, for example by means of a square profile, so that only the rotational movement of guide pin is passed on to the shift pin.

The gear cable actuates the guide pin, wherein the gear cable is decoupled from the rotational movement of the guide pin by means of a bearing. If the rider triggers a gear change, the gear cable is displaced together with the guide pin in the axial direction. At the same time the guide pin rotates through a defined angle, which is pre-defined by the obliquely extended guide slot, in relation to the guide shaft. The shift pin is rotated together with the guide pin. An axial displacement of the shift pin is, however, made impossible by virtue of an axial guidance to the intermediate shaft.

Alternatively to this design, the axially displaceable guide pin can also be arranged within the shift pin and be connected for co-rotation with the intermediate shaft. A slot provided in the guide pin and a pin in the shift pin which is guided in said slot are formed in such a way that, under an axial displacement of the guide pin, the shift pin performs a rotation relative to the intermediate shaft.

In the two abovementioned embodiments, the guide slot and the pin can also be swapped on the relevant components.

If the rider wishes to shift down a gear while riding, the torque at the time of the gear change is potentially so large that the force exerted by means of the shift pin on the freewheel bodies is not sufficient to overcome the static friction force between the freewheel body and the engageable gear wheel. At this point the gear changing force is not sufficient to disengage the gear.

For this reason, it is preferably arranged that the gear cable is not connected directly to the shift pin, and/or to the guide pin, but that instead an intermediate pre-loading mechanism is engaged. As a result of the pre-load on the shift pin, the pre-selected gear is not engaged until the pedalling force, on account of its oscillating magnitude, drops below the triggering threshold.

The pre-loading mechanism comprises a pre-loaded spring, the pre-loading force of which is greater than the tensile force of the return spring of the shift pin which performs the up shift. If, during the phase of increasing torque, the rider initiates a shift to a lower gear, then initially the spring of the pre-loading mechanism is tensioned and locked in the pre-selected gear. If the driving torque drops again, a triggering threshold is reached from which the pre-loading force is sufficiently large to overcome the static friction force between the freewheel body and the engageable gear wheel. The pre-loading mechanism rapidly returns to its starting position and pulls the shift pin along with it. The pre-selected gear is then engaged. FIG. 13 shows the schematic sequence of the pre-loading mechanism described here.

Since shifts to a higher gear take place virtually free of shifting forces, but shifts to a lower gear are associated with increased shifting force, it can also be arranged that the oblique surfaces 69, 69' and/or the stops on the shift pin 65, 65a are designed asymmetrically. In this way the oblique surface 69, 69', which comes into engagement during down shifts, can be realised at a flatter angle, as in this way a higher force is generated on the freewheel body in order to press it out from the internal gearing 59 of the gear wheel.

In order to protect the gearing components, in particular the gear wheels, against overloading, it can also be arranged for the transmission unit to be equipped with a shear-off protection device. Instead of a conventional shaft-hub connection, plastic elements can be used for example to establish a positive shaft-hub connection. These are dimensioned in such a way that they shear off at a particular load and thus act as a predetermined breaking point.

Shafts with freewheel bodies are, on account of the high surface pressure at the contact surfaces between the freewheel body and the intermediate shaft, manufactured from hardened and tempered steel. In order to be able to manufacture the intermediate shafts from more lightweight, less resilient materials, steel pins can thus be provided which are inserted into the intermediate shafts and serve as the axis of rotation for the freewheel bodies. The pins can, for example, be inserted into the intermediate shafts through holes drilled in the end face.

It can also be arranged that, instead of using torsion springs, spring rings are used to align the freewheel bodies. These are preferably matched to circumferential slots provided in the intermediate shafts, so that the sliding surface of the gear wheels is minimally disturbed. The spring rings press on the rear end of the freewheel bodies and deflect them as soon as they are released by means of the shift pin located in the intermediate shaft.

If the means of shifting/engagement are designed as claw couplings, the odd gears should preferably be arranged side-by-side and the even gears should preferably be arranged side-by-side. As a result, neighbouring gears can be selected by means of a single, albeit two-sided coupling means. If, for example, a shift takes place from an odd gear to a following, even gear, then the coupling means of the previously engaged odd gear becomes free, and during subsequent shifting to the in turn following gear the coupling means which previously became available can be used for this gear.

Through a special arrangement of the individual sub-transmissions in the overall transmission unit 7, in particular the design of the gearing mechanism [b] with two simultaneously driven intermediate shafts 19a and 19b, and the formation of the output shaft 23 as a hollow shaft which is coaxial to the through shaft 13 of the transmission unit 7, a form of transmission unit is obtained which is ideal for bicycles. The overall transmission unit 7 substantially has the form of a rounded-off triangle, which can be optimally arranged between the lower tube and the saddle tube of a conventional bicycle frame.

By virtue of the integration of the through shaft 13, which is provided for mounting of the foot pedals 9 and 9', in the transmission unit 7, the multi-speed gearing mechanism simultaneously performs the role of a conventional bottom bracket.

The invention is not restricted to the described embodiments example; and instead it can be varied in many different ways. For example, the choice of the number of teeth on the gear wheels is not limited to the number of teeth proposed in the example embodiments. Also, the sub-transmissions [a], [aa], [b], [c], [d] and [e] provided in the transmission unit 7 described here are not mandatory and can be freely modified. In particular, it is also possible to alter the sequence of the logical series connection of the sub-transmissions, or individual sub-transmissions can be omitted. The individual sub-transmissions can also be equipped with different numbers of gears to those indicated in the examples. The actuation of the shift pins is also not restricted to an embodiment which has one gear cable, and for example the actuation can be implemented by means of a plurality of gear cables, a linkage, a hydraulic system or electric actuators.

Furthermore, the transmission unit 7 is not limited to applications in bicycles. It is equally conceivable that the transmission unit could be used in other vehicles which are driven by muscle power. Finally, it is understood that the different features can also be used in other combinations than those described and shown in the drawings.

The following is a list of further embodiments of the disclosed subject matter:

1. Transmission unit (7) for a vehicle driven by muscle power, having one through shaft (13) and one output shaft (23), as well as having at least two sub-transmissions ([a], [aa], [b], [c], [d], [e]) and having at least one intermediate shaft (17, 19a, 19b, 21), wherein at least one of the intermediate shafts (17, 19a, 19b, 21) and/or the output shaft (23) is formed as a hollow shaft which is arranged coaxially to another shaft of the transmission unit (7).
2. The transmission unit according to embodiment 1, wherein it is substantially capable of being arranged in the centre of a bicycle.
3. The transmission unit according to embodiment 1 or embodiment 2, wherein it is capable of being arranged in a gear housing (5).
4. The transmission unit according to one of the preceding embodiments, wherein the through shaft (13) has at each of both ends one mounting section (15, 15') to which a foot pedal (9, 9') can be respectively attached.
5. The transmission unit according to one of the preceding embodiments, wherein the output shaft (23) has one mounting section (27) for mounting a chain wheel (11).
6. The transmission unit according to one of the preceding embodiments wherein the output shaft (23) is formed as a hollow shaft and is arranged coaxially to the through shaft (13).
7. The transmission unit according to one of the preceding embodiments wherein the output shaft (23) is formed as a hollow shaft and is arranged coaxially to an intermediate shaft (21).
8. The transmission unit according to one of the preceding embodiments, wherein one intermediate shaft (17) is formed as a hollow shaft and is arranged coaxially to a further intermediate shaft (21).
9. The transmission unit according to one of the preceding embodiments, wherein one output gear wheel (13-a), which is coupled for co-rotation to the through shaft (13), is provided for torque reduction.
10. The transmission unit according to one of the preceding embodiments, wherein one gear cage (12) is provided in which the transmission unit (7) is arranged as a unit.
11. The transmission unit according to embodiment 10, wherein the gear cage (12) is arranged in a gear housing (5) which is formed as part of a bicycle frame.
12. The transmission unit according to one of the preceding embodiments, wherein at least one sub-transmission ([b], [d]) is designed to be shiftable.
13. The transmission unit according to embodiment 12, wherein at least two shiftable sub-transmissions ([b], [d]) are provided.
14. The transmission unit according to one of the preceding embodiments, wherein at least one shiftable sub-transmission ([b], [d]) is capable of being coupled by means of a claw coupling, a toothed coupling, or by means of an engageable freewheel to at least one gear wheel (19a-1, 19a-2, 19a-3, 19b-1, 19b-2, 19b-3, 21-3, 21-4, 21-5).
15. The transmission unit according to one of the preceding embodiments, wherein at least one of the intermediate shafts (19a, 19b, 21) of the shiftable sub-transmissions ([b], [d]) is formed as a hollow shaft in which coupling means are arranged.
16. The transmission unit according to one of the preceding embodiments, wherein five sub-transmissions ([a], [b], [c], [d], [e]) are provided.
17. The transmission unit according to one of the preceding embodiments, wherein at least one shaft (13, 19a, 19b, 17, 21, 23) forms an axis of rotation for a rear swinging fork.
18. The transmission unit according to one of the preceding embodiments, wherein one sub-transmission ([a]) is provided which is formed by virtue of
   the through shaft (13) which is equipped with one drive gear wheel (13-1), and
   one output gear wheel (17-1) which is mounted for co-rotation on an intermediate shaft (17).
19. The transmission unit according to one of the preceding embodiments, wherein a gearing mechanism ([b]) is provided which is formed by virtue of
   at least one gear wheel (17-2, 17-3, 17-4) which is mounted for co-rotation on the intermediate shaft (17), and
   at least one intermediate shaft (19a, 19b) having at least one output gear wheel (19a-1, 19a-2, 19a-3, 19b-1, 19b-2, 19b-3) which is preferably engageably mounted on this shaft.
20. The transmission unit according to one of the preceding embodiments, wherein a gearing mechanism ([c]) is provided which is formed by virtue of
   at least one drive gear wheel (19a-4, 19b-4) which is mounted for co-rotation on each intermediate shaft (19a, 19b), and by virtue of
   at least one output gear wheel (21-1, 21-2) which interacts with the drive gear wheel (19a-4, 19b-4) and is mounted for co-rotation on an intermediate shaft (21).
21. The transmission unit according to one of the preceding embodiments, wherein a gearing mechanism ([d]) is provided which is formed by virtue of one intermediate shaft (21) which is driven by means of the output gear wheel (21-1, 21-2), and by virtue of
   at least one gear wheel (21-3, 21-4, 21-5) which is preferably engageably mounted on the intermediate shaft (21) and which interacts with the output shaft (23) via at least one output gear wheel (23-1, 23-2, 23-3).
22. The transmission unit according to one of the preceding embodiments, wherein it has an almost constant gradation between the, preferably all, gears.
23. The transmission unit according to one of the preceding embodiments, wherein it has a spread of approximately 666.65%, in particular a spread of 670%.
24. The transmission unit according to one of the preceding embodiments, wherein means of shifting/engagement for realisation of a coupling between at least one intermediate shaft (19a, 19b, 21) and at least one engageable gear wheel (19a-1, 19a-2, 19a-3, 19b-1, 19b-2, 19b-3, 21-3, 21-4, 21-5) are provided, which are formed as an engageable freewheel.
25. The transmission unit according to one of the preceding embodiments, wherein an engageable gear wheel (19a-1, 19a-2, 19a-3, 19b-1, 19b-2, 19b-3, 21-3, 21-4, 21-5) has an inner ring (41) which is furnished with an internal gearing (59).

26. The transmission unit according to one of the preceding embodiments, wherein the internal gearing (59) interacts with a freewheel body.

27. The transmission unit according to embodiment 26, wherein the freewheel body is capable of being arranged in a cutout (67) provided in a shift pin (65, 65*a*).

The invention claimed is:

1. A multispeed transmission for a muscular strength-powered vehicle, comprising:
    a gear unit;
    a gear housing; and
    a gear cage for mounting the gear unit,
    the gear unit including a plurality of gear wheels and at least one shaft, wherein the at least one shaft defines a gear unit main axis,
    the gear cage including a plurality of bearings for rotatably mounting the at least one shaft of the gear unit, and being assembled of multiple parts,
    the gear housing being adapted to be fixedly mounted to the vehicle and including a sealing for sealing the gear housing,
    the gear cage being formed separate from the gear housing as a module and being adapted to be removably mounted in the gear housing,
    wherein the gear housing is formed such that the gear cage with the gear unit mounted thereon is configured to be inserted into the gear housing in a direction parallel to the gear unit main axis.

2. The multispeed transmission as claimed in claim 1, wherein the gear cage further comprises a plurality of bearings plates and a plurality of spacers connecting the bearing plates to each other.

3. The multispeed transmission as claimed in claim 2, wherein gear wheels of the gear unit are mounted between the bearing plates.

4. The multispeed transmission as claimed in claim 2, wherein the plurality of bearings for rotatably mounting the at least one shaft are mounted at the bearing plates.

5. The multispeed transmission as claimed in claim 1, further comprising at least one housing cover which is adapted to close the gear housing.

6. The multispeed transmission as claimed in claim 5, comprising two housing covers, which are adapted to close the gear housing in an assembled state at opposite sites thereof.

7. The multispeed transmission as claimed in claim 5, wherein the at least one shaft of the gear unit sealingly extends through the housing cover.

\* \* \* \* \*